(12) United States Patent
Raghavulu et al.

(10) Patent No.: US 12,306,692 B2
(45) Date of Patent: May 20, 2025

(54) SYSTEMS, METHODS, AND APPARATUS FOR DISPLAY PANEL HUMAN PRESENCE DETECTION

(71) Applicant: Intel Corporation, Santa Clara, CA (US)

(72) Inventors: Venkat Raghavulu, Bangalore (IN); Ke Han, Shanghai (CN)

(73) Assignee: Intel Corporation, Santa Clara, CA (US)

(*) Notice: Subject to any disclaimer, the term of this patent is extended or adjusted under 35 U.S.C. 154(b) by 113 days.

(21) Appl. No.: 17/917,876

(22) PCT Filed: Jun. 26, 2020

(86) PCT No.: PCT/CN2020/098325
§ 371 (c)(1),
(2) Date: Oct. 7, 2022

(87) PCT Pub. No.: WO2021/258394
PCT Pub. Date: Dec. 30, 2021

(65) Prior Publication Data
US 2023/0195196 A1     Jun. 22, 2023

(51) Int. Cl.
*G06F 1/32*     (2019.01)
*G06F 1/3231*   (2019.01)
*G06F 1/3296*   (2019.01)
*G06F 3/14*     (2006.01)

(52) U.S. Cl.
CPC .......... *G06F 1/3231* (2013.01); *G06F 1/3296* (2013.01); *G06F 3/14* (2013.01)

(58) Field of Classification Search
CPC ........................................................ G06F 1/32
See application file for complete search history.

(56) References Cited

U.S. PATENT DOCUMENTS

| 2003/0081758 | A1* | 5/2003 | Kumar | ................ H04M 1/2757 |
| | | | | 379/355.03 |
| 2011/0316840 | A1 | 12/2011 | Hirata et al. | |
| 2014/0111500 | A1* | 4/2014 | Kasuga | .................... G09G 5/00 |
| | | | | 345/212 |

(Continued)

FOREIGN PATENT DOCUMENTS

| CN | 107566869 A | 1/2018 |
| CN | 108831388 A | 11/2018 |

(Continued)

OTHER PUBLICATIONS

International Searching Authority, "International Search Report," issued Mar. 26, 2021 in connection with International Patent Application No. PCT/CN2020/098325, 4 pages.

(Continued)

*Primary Examiner* — Paul B Yanchus, III
(74) *Attorney, Agent, or Firm* — Hanley, Flight & Zimmerman, LLC

(57) ABSTRACT

Methods, apparatus, systems and articles of manufacture are disclosed for display panel human presence detection. An example display device includes a sensor to generate a detection signal based on whether a human is detected, and logic circuitry to generate a control signal to cause an adjustment of a power state of the display device based on the detection signal.

24 Claims, 19 Drawing Sheets

(56) References Cited

U.S. PATENT DOCUMENTS

2014/0189395 A1    7/2014  Kp
2017/0003726 A1    1/2017  Chang
2017/0010654 A1*  1/2017  Chen .................... G06F 1/3265
2017/0229073 A1    8/2017  Fincer et al.

FOREIGN PATENT DOCUMENTS

| CN | 109493792 A | 3/2019 |
| CN | 110211528 A | 9/2019 |
| JP | 2004220441 A | 8/2004 |
| JP | 2007298753 A | 11/2007 |

OTHER PUBLICATIONS

International Searching Authority, "Written Opinion," issued Mar. 26, 2021 in connection with International Patent Application No. PCT/CN2020/098325, 5 pages.

International Searching Authority, "International Preliminary Report on Patentability," issued Dec. 13, 2022 in connection with International Patent Application No. PCT/CN2020/098325, 5 pages.

European Patent Office, "Extended European Search Report," issued in connection with European Patent Application No. 20941702.1, issued on Dec. 14, 2023, 16 pages.

* cited by examiner

| INPUT A ⟋ 510 | INPUT B ⟋ 520 | OUTPUT Y ⟋ 530 |
|---|---|---|
| HPS SIGNAL<br><br>0 – HUMAN PRESENT<br>1 – HUMAN ABSENT | HPD SIGNAL<br><br>1 – PANEL CONNECTED<br>0 – PANEL DISCONNECTED | HDL SIGNAL |
| 0 | 0 | 0 |
| 0 | 1 | 1 |
| 1 | 0 | 1 |
| 1 | 1 | 0 |

| INPUT A | INPUT B | OUTPUT Y |
|---|---|---|
| HPS SIGNAL<br><br>0 – HUMAN PRESENT<br>1 – HUMAN ABSENT | HPD SIGNAL<br><br>1 - PANEL CONNECTED<br>0 – PANEL DISCONNECTED | MAIN SoC DECISION OVER AUX CHANNEL<br><br>1 – PANEL REMAIN CONNECTED<br>0 – PANEL TO BE DISCONNECTED |
| 0 | 1 | 1 |
| 0 | 0 | 0 |
| 1 | 1 | 1 |
| 1 | 0 | 0 |
| X | 0 | 0 |

FIG. 6

SYSTEMS, METHODS, AND APPARATUS FOR DISPLAY PANEL HUMAN PRESENCE DETECTION

This Patent arises from a U.S. National Stage Patent Application under 35 U.S.C. § 371 of the PCT Patent Application No. PCT/CN2020/098325, filed Jun. 26, 2020, and entitled "SYSTEMS, METHODS, AND APPARATUS FOR DISPLAY PANEL HUMAN PRESENCE DETECTION." PCT Patent Application No. PCT/CN2020/098325 is hereby incorporated herein by reference in its entirety.

FIELD OF THE DISCLOSURE

This disclosure relates generally to device power management and, more particularly, to systems, methods, and apparatus for display panel human presence detection.

BACKGROUND

Computing devices can consume relatively large amounts of energy when executing computationally intensive tasks. Power management tools may be deployed to such computing devices to manage energy expenditure and/or extend battery life. Wasteful and/or unnecessary energy consumption by a computing device can unintentionally occur when a human user steps away from the computing device and/or otherwise is no longer present near the computing device.

BRIEF DESCRIPTION OF THE DRAWINGS

FIG. 6 depicts an example logic table reflecting example input and output relationships for example operating conditions associated with the example human detection system of FIG. 2 and/or the example human detection controller of FIG. 4.

The figures are not to scale. In general, the same reference numbers will be used throughout the drawing(s) and accompanying written description to refer to the same or like parts.

Figure 1:
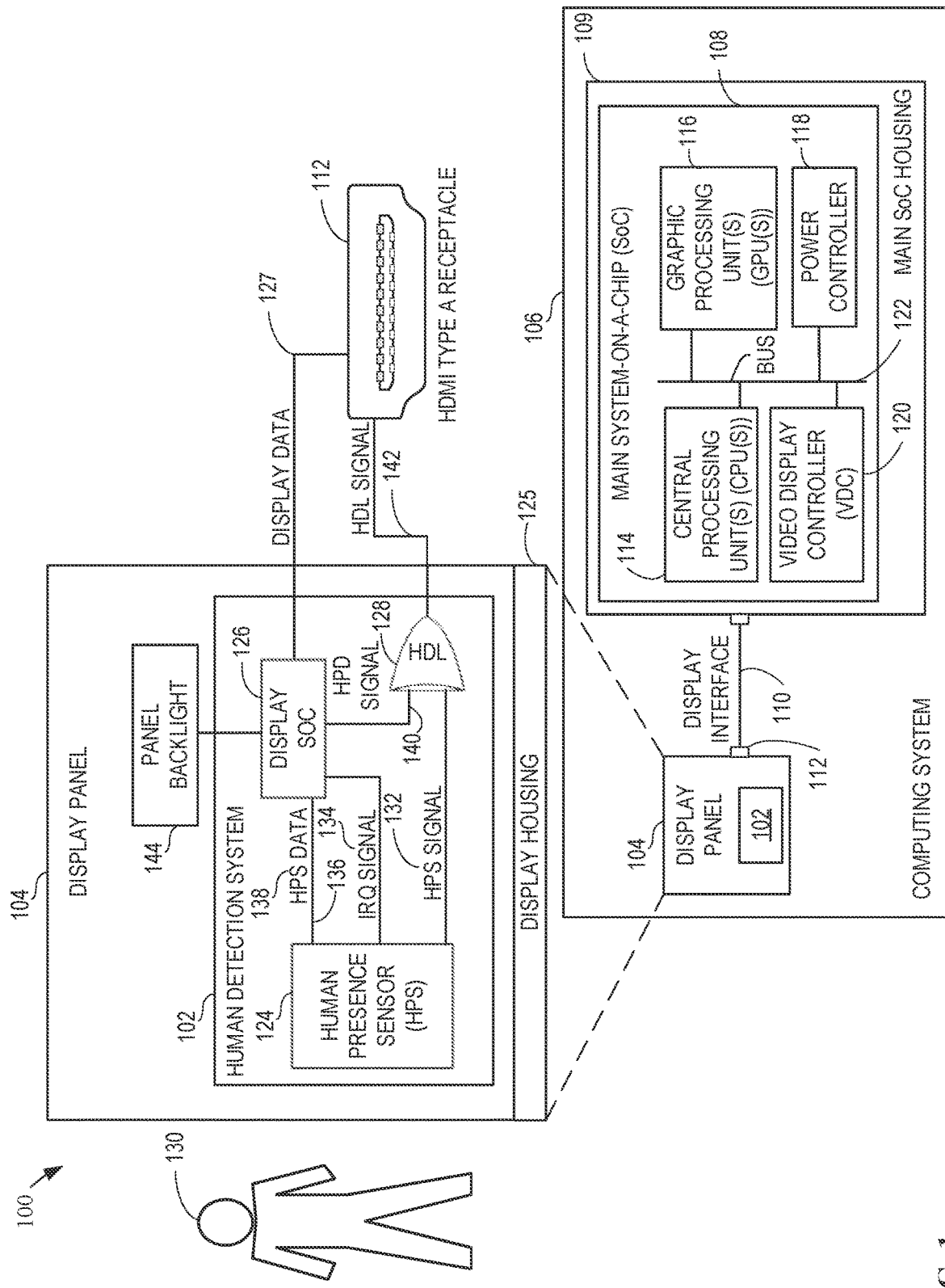
FIG. 1 is a schematic illustration of an example human detection system including an example human detection logic circuit to facilitate power management of an example display panel.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Computing devices can consume relatively large amounts of energy when executing computationally intensive tasks.

Power management tools may be deployed on computing devices (e.g., on computing devices that are energy limited, such as computing devices that are battery powered). Such power management tools may manage energy expenditure and/or otherwise extend battery life. For example, a host operating system (OS) running on and/or otherwise executed by a central processing unit (CPU) of a computing device may reduce a brightness of a display panel or device to reduce energy consumption. In other examples, the host OS can turn off the display panel when a user (e.g., a human, a human user, etc.) steps away from the computing device and is no longer present in front of the display panel.

A human presence sensors (HPS) can be used to detect whether a human is proximate to a display panel, such as when the human is in front of the display panel or within a range (e.g., a range of 6 inches to 6 feet, a range of 0 to 5 feet, etc.) and/or angle (e.g., an angle of 5 degrees from a center point of the display, an angle of 30 degrees from the center point, etc.) of the display panel from which the HPS can detect the presence of the human. For example, the HPS can detect the human in response to the human being in a vicinity of the display panel that is within a threshold range of the HPS. An HPS can be based on one or more different sensing techniques or technologies. For example, an HPS can be an infrared sensor, a time-of-flight laser sensor, an ultrasonic sensor, a millimeter wave radar sensor, or a camera or camera-based sensor. In some instances, the HPS can be coupled to an integrated sensor hub (ISH) on host hardware (e.g., a system-on-a-chip (SoC) including one or more processors). In such instances, the HPS can trigger a wake event (e.g., a wake-on-approach event) in the host OS of the host hardware when the HPS detects human presence. In other instances, the HPS can trigger a sleep event (e.g., a walk-away-lock event) in the host OS when the HPS detects human absence (e.g., the HPS does not detect a presence of a human).

In some computing devices, the HPS is part of a sensing subsystem in a platform (e.g., an SoC, a motherboard including a processor, etc.). The sensing subsystem can be a sensor hub (e.g., an ISH), or input/output (I/O) interfaces such as an inter-integrated circuit (I2C) protocol interface, a serial peripheral interface (SPI) bus, etc. In such computing devices, the sensing subsystem can communicate to the host OS of the platform about whether absence or presence of a human is detected. The host OS can inform the display subsystem to perform a control task such as to turn on or off the display panel, to reduce display brightness, etc. For instance, the host OS of an SoC can instruct a video display controller (VDC) of the SoC to transmit display data to a display panel when the HPS detects human presence. In other instances, the host OS can instruct the VDC to cease transmitting display data to the display panel when the HPS detects an absence of a human.

Examples disclosed herein include example human detection systems to invoke example hardware in an example display device to execute human presence detection. Examples disclosed herein reduce and/or eliminate the need for HPS trigger events to be transmitted to, and/or power state tasks (e.g., turning on or off a display, adjusting a backlight brightness or intensity, etc.) to be executed with, an OS, drivers, and/or an I/O sensing subsystem of host hardware (e.g., an SoC). In some disclosed examples, the example hardware is integrated into a display panel to generate HPS trigger events and/or execute power state tasks associated with the display panel. For example, the display panel hardware includes an SoC (e.g., a display SoC), human detection logic (e.g., software, firmware, and/or hardware), I/O interface(s), I/O bus(es), etc., and/or a combination thereof.

In some disclosed examples, the HPS trigger events are communicated to the display SoC without any host OS-based triggers and/or without any host OS interventions. For example, the host OS-based triggers and/or the host OS interventions correspond to triggers and/or interventions by an OS on a main or host SoC external to the display device. In such examples, the HPS trigger events are communicated from the HPS to the display SoC without going through the main SoC. In some such examples, the human detection systems included in the display panel are fully isolated from the interventions of the main SoC.

In some disclosed examples, the human detection system includes human detection logic to compare an HPS signal and a connection status signal, such as a hot-plug-detect (HPD) signal. For example, the HPS signal is indicative and/or otherwise representative of human absence or human presence (e.g., the absence of a person in the range of the detection system or the presence of a person within that range). In such examples, the HPS signal is an indication of either human absence or human presence. In some such examples, the HPD signal is indicative and/or otherwise representative of a connection (e.g., an active connection, an enabled connection, etc.) between a display SoC and host hardware (e.g., a main SoC). In such disclosed examples, the HPS signal invokes the display SoC to adjust a power state of the display panel based on whether a human is detected. In some disclosed examples, the human detection logic instructs the host hardware via the HPD signal to trigger transmission of display data to be rendered on the display panel in response to the HPS detecting human presence. In some disclosed examples, the human detection logic instructs the host hardware to reduce a screen brightness and/or to cease transmission of data to the display in response to the HPS detecting human absence.

In some disclosed examples, the display SoC obtains the HPS signal and/or detection parameters associated with the HPS from the HPS. In some such disclosed examples, the display SoC transmits detection data including at least one of the HPS signal or the detection parameters to the main SoC. For example, the display SoC transmits the detection data over an auxiliary (AUX) channel of an interface, such as a high definition multimedia interface (HDMI). In some such disclosed examples, the main SoC compares the detection data to a power profile (e.g., a power management profile) associated with at least one of the main SoC or the display SoC. In some examples, the main SoC determines whether to adjust a power state of the display device based on the comparison.

Advantageously, some examples disclosed herein effectuate human detection in computing systems that do not include an ISH by including the human detection system in the display panel. In some desktop computing systems, the HPS is coupled to host hardware because the distance between the display panel and the host hardware exceeds the capabilities of I2C and general-purpose input/output (GPIO) communications. Advantageously, examples disclosed herein effectuate human detection in computing systems, such as desktop computing systems, notebook or laptop computing systems, gaming systems, television systems, etc., by including the example human detection system in the display SoC of the display panel rather than in the host hardware.

FIG. 1 is a schematic illustration of a first example computing environment 100 including a first example human detection system 102 to facilitate power management of a first example display panel 104. The first computing environment 100 includes a first example computing system 106, which includes the first display panel 104 and an example main system-on-a-chip (SoC) 108. In this example, the first computing system 106 is a desktop computer, a television (e.g., a smart television, an Internet-enabled television, etc.), a phone (e.g., a smartphone, an Internet-enabled phone, etc.), a gaming system (e.g., a system including a gaming console and a display device), or any other computing device or system. The main SoC 108 may be present, for example, in an example housing 109 of a desktop computing or other device, such as a mobile device, a television, etc.

The first display panel 104 is a display device including a screen for presenting content. For example, the first display panel 104 is a light emitting diode (LED) display, an organic light emitting diode (OLED) display, a liquid crystal display (LCD), a cathode ray tube (CRT) display, an in-place switching (IPS) display, or a touchscreen. An example display interface 110, which includes an example receptacle (e.g., an interface receptacle) 112, couples the first display panel 104 to the main SoC 108. The display interface 110 of the example of FIG. 1 is a high definition multimedia interface (HDMI) interface. For example, the display interface 110 may include a cable (e.g., an HDMI cable), a first interface port (e.g., a first HDMI interface port) on the first display panel 104, a second interface port (e.g., a second HDMI interface port) on the main SoC 108 or on the housing 109 of the main SoC 108, etc. The display interface 110 includes one or more example receptacles 112. The receptacle 112 of the example of FIG. 1 is an HDMI type-A connector or receptacle. Alternatively, the first display panel 104 may be coupled to the main SoC 108 or the housing 109 of the main SoC 108 using any other type of cable (e.g., an HDMI mini cable, an HDMI micro cable, a universal serial bus (USB) cable (e.g., a USB Type-C cable)), communication protocol, and/or communication interface. Alternatively, the display interface 110 of FIG. 1 may have any other quantity and/or type of receptacle.

The main SoC 108 of the example of FIG. 1 is host hardware. For example, the main SoC 108 is a host (e.g., a computing host) that includes hardware to generate video data for presentation on the display panel 104. The main SoC 108 may be implemented by one or more integrated circuits (ICs) (e.g., compact ICs) that incorporate components of a computer and/or other electronic system in a compact format. For example, the main SoC 108 may be implemented by a combination of one or more programmable processors, hardware logic, and/or hardware peripherals and/or interfaces. The main SoC 108 of the example of FIG. 1 includes one or more example central processing units (CPUs) 114, one or more example graphic processing units (GPUs) 116, an example power controller 118, and an example video display controller (VDC) 120. The CPU(s) 114, the GPU(s) 116, the power controller 118, and the VDC 120 are communicatively coupled to one or more example bus(es) 122. For example, the bus(es) 122 may be implemented by at least one of an I2C bus, a SPI bus, a Peripheral Component Interconnect (PCI) bus, or any other communication protocol between integrated circuits (ICs). In this example, the power controller 118 and/or the VDC 120 may be implemented by hardware, software, and/or firmware.

Additionally or alternatively, the example main SoC 108 of FIG. 1 may include memory (e.g., flash memory, random access memory (RAM), etc.), input/output (I/O) port(s), and/or secondary storage. For example, the main SoC 108 includes the one or more CPUs 114, the one or more GPUs 116, the power controller 118, the VDC 120, the bus(es) 122, the memory, the I/O port(s) and device(s), and/or the secondary storage all on the same substrate. In some examples, the main SoC 108 includes digital, analog, mixed-signal, radio frequency (RF), or other signal processing functions. In some examples, at least one of the one or more CPUs 114, the one or more GPUs 116, the power controller 118, the VDC 120, the bus(es) 122, the memory, the I/O port(s), or the secondary storage may be virtualized, such as by being implemented by a virtual machine, a hyper-converged infrastructure, etc., and/or a combination thereof.

The VDC 120 may be implemented by one or more integrated circuits. The VDC 120 of the example of FIG. 1 implements a video signal generator, which is responsible for the generation of a video signal, and, in some examples, an audio signal. In this example, the host OS of the main SoC 108 controls the VDC 120 with one or more drivers (e.g., device drivers) executed by the OS. In some examples, the VDC 120 generates video signals by generating the timing of the video signals, such as the horizontal and vertical synchronization signals and the blanking interval signal. In some examples, the VDC 120 generates video signals in accordance with a digital display, an analog display (e.g., a CRT display), etc. In some examples, the GPU(s) 116 generates pixel data (e.g., pixels) for assembly and/or compilation into video signals by the VDC 120. In such examples, the VDC 120 transmits the video signals as video data to the first display panel 104 for rendering and/or otherwise presentation to a user, such as the human 130.

In the example of FIG. 1, the first display panel 104 includes the first human detection system 102. The first human detection system 102 includes an example human presence sensor (HPS) 124, an example display SoC (e.g., a display panel SoC, a display device SoC, etc.) 126, and example human detection logic (HDL) 128. Alternatively, the first display panel 104 may not include the HPS 124, the display SoC 126, and/or the HDL 128. For example, one or more of the HPS 124, the display SoC 126, and/or the HDL 128 may be external to the first display panel 104.

The HPS 124 of this example is a proximity sensor, such as an infrared sensor. For example, the HPS 124 adjusts an output electrical signal (e.g., a voltage, a current, etc.) by detecting a change in inductance, capacitance, photoelectric field, magnetic field, etc., and/or a combination thereof, in response to a presence or absence of an object (e.g., the human 130) proximate and/or otherwise near the HPS 124. Alternatively, the HPS 124 may be a time-of-flight laser sensor, an ultrasonic sensor, a millimeter wave radar sensor, or a camera or camera-based sensor.

In some examples, the HPS 124 implements means for generating (e.g., first means for generating) a detection signal based on whether a human is detected. In such examples, the first means for generating may be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)), proximity sensor(s), time-of-flight laser sensor(s), ultrasonic sensor(s), millimeter wave radar sensor(s), or camera(s) or camera-based sensor(s).

The display SoC 126 is display device hardware coupled to an example housing 125 of the first display panel 104 and/or to a base or stand coupled to the housing 125 and/or otherwise associated with the first display panel 104. The display SoC 126 may be implemented by one or more programmable processors, hardware logic, one or more hardware peripherals, one or more hardware interfaces, etc., and/or a combination thereof. For example, the display SoC 126 implements a display OS representative of software and/or firmware executing on display hardware to control the first display panel 104.

A first input (e.g., an example HPS signal 132) of the HDL 128 is communicatively coupled to and/or in circuit with an output of the HPS 124. A second input (e.g., an example hot plug detect (HPD) signal 140) of the HDL 128 is coupled to and/or otherwise in circuit with an output of the display SoC 126. An output of the HDL 128 is communicatively coupled to and/or in circuit with the receptacle 112. The HDL 128 of this example is logic circuitry. For example, the HDL 128 is implemented with hardware, which may be represented by software and/or firmware. In such examples, the HDL 128 may be implemented by one or more analog or digital circuit(s), logic circuits and gates, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the illustrated example of FIG. 1, the HDL 128 is coupled to a pin (e.g., an electrical pin, a connector pin, etc.) of the receptacle 112. For example, the HDL 128 is coupled to the VDC 120, and/or, more generally, the main SoC 108, via a pin of the receptacle 112. For example, the display SoC 126 is coupled to the VDC 120, and/or, more generally, to the main SoC 108, via one or more pins of the receptacle 112. In such examples, the display SoC 126 transmits and/or receives example display data 127, such as Digital Visual Interface (DVI) signals, HDMI signals, etc.

In some examples, the display data 127 includes video data (e.g., pixel data) to be presented on the first display panel 104. In some examples, the display data 127 includes communication signals (e.g., auxiliary (AUX) signals) or data that are transmitted over communication channel(s) (e.g., AUX channel(s). In such examples, the one or more different pins of the receptacle 112 are AUX pins or ports to facilitate communication between the main SoC 108 and the display SoC 126 over one or more AUX channels. For example, the host OS of the main SoC 108 is in communication with the display SoC 126 (e.g., the display OS of the display SoC 126) via the AUX pin(s) of the receptacle 112, the AUX channel(s) of the display interface 110, etc.

The first computing environment 100 includes the first human detection system 102 to adjust a power state of the first display panel 104 based on whether one or more humans (e.g., users, human users, etc.) 130 are absent or present. For example, the first human detection system 102 causes the first display panel 104 to adjust from a first power state to a second power state in response to detecting an absence of the human 130 and/or in response to not detecting a human. In such examples, the first power state occurs when the first display panel 104 is turned on and, thus, in a powered or enabled state, and the second power state occurs when the first display panel 104 is turned off and, thus, in a powered off, reduced power, sleep, or disabled state. In other examples, the first power state is a first brightness level, a first backlight intensity value, etc., and the second power state is a second brightness level, a second backlight intensity value, etc. In some such examples, the second brightness level, the second backlight intensity value, etc., is less than the first brightness level, the first backlight intensity value, etc.

In some examples, the first human detection system 102 causes the first display panel 104 to adjust from the second power state to the first power state in response to detecting the human 130. For example, the first human detection system 102 of the illustrated example causes the first display panel 104 to turn on in response to detecting the human 130. In other examples, the first human detection system 102 causes the first display panel 104 to increase a brightness level, a backlight intensity value, etc., in response to detecting the human 130.

The first human detection system 102 includes the HPS 124 to detect and/or otherwise determine whether the human 130 is present and/or otherwise proximate the first display panel 104. The HPS 124 generates an example HPS signal 132 and an example interrupt request (IRQ) signal 134 based on the detection. The HPS signal 132 is a detection signal indicative of whether the HPS 124 detects a presence of the human 130. For example, the HPS 124 of the illustrated example transmits the HPS signal 132 to the HDL 128 and the IRQ signal 134 to the display SoC 126. In some such examples, the display SoC 126 determines whether the human 130 is detected based on the IRQ signal 134.

In some examples, the IRQ signal 134 is a signal that is toggled (e.g., from a logic low signal to a logic high signal, from a logic high signal to a logic low signal, etc.) based on a state change of the HPS 124. For example, the HPS 124 asserts the IRQ signal 134 in response to a change from detecting a presence of the human 130 to detecting an absence of the human 130, a change from detecting an absence of the human 130 to detecting a presence of the human 130, etc. In such examples, in response to an assertion of the IRQ signal 134 based on the change, the display SoC 126 obtains the HPS data 138, which includes the HPS signal 132, from the HPS 124. In some such examples, the display SoC 126 instructs the HPS 124 to reset the IRQ signal 134 from a logic high signal to a logic low signal in response to obtaining the HPS data 138.

In some examples, the HPS 124 generates the HPS signal 132 to have a first value (e.g., a logic high value representative of an analog or digital '1', a first voltage, a first current, etc.) in response to detecting an absence of the human 130. The HPS 124 also asserts the IRQ signal 134 as described above in response to detecting an absence of the human 130. These two signals are generated simultaneously or asynchronously with a time lag between each other.

In some examples, the HPS 124 generates the HPS signal 132 to have a second value (e.g., a logic low value representative of an analog or digital '0', a second voltage, a second current, etc.) in response to detecting the human 130 being proximate and/or otherwise present near the first display panel 104, where the second value is different from the first value. The HPS 124 also asserts the IRQ signal 134 as described above in response to detecting the human 130 being proximate and/or otherwise present near the first display panel 104. These two signals are generated simultaneously or asynchronously with a time lag between each other.

In the illustrated example of FIG. 1, the HPS 124 communicates with the display SoC 126 via an example bus (e.g., a data bus, a data interface bus, etc.) 136. For example, the bus 136 is an I2C bus that can transport the HPS data 138 generated by the HPS 124 to the display SoC 126. In other examples, the bus 136 can be a SPI bus or any other bus and/or communication protocol. In some examples, the HPS 124 transmits example HPS data 138 to the display SoC 126. For example, the HPS data 138 is detection data and/or metadata that includes one or more detection parameters representative of a configuration (e.g., an HPS configuration) of the HPS signal 132. In some examples, the detection data, the detection metadata, and/or the detection parameters (referred to herein generally as the HPS data 138) includes a current or instant distance measurement reflecting a spacing between the HPS 124 and the human 130, an indicator or alert representative of whether the human 130 is present or absent (e.g., a human detection alert or indicator when the human 130 is present and/or not detected as absent, a human absence alert or indicator when the human 130 is absent and/or not detected as present, etc.), a presence confidence value (e.g., a quantification of how confident the HPS 124 is that the human 130 is either absent or present), an attention level (e.g., how attentive the human 130 is with respect to the first display panel 104), an attention confidence value (e.g., a quantification of how confident the HPS 124 is that the human 130 has a specified level of attentiveness with respect to the first display panel 104), a threshold of detection (e.g., a threshold distance of the human 130, a threshold presence confidence, etc., and/or a combination thereof), HPS capabilities (e.g., whether the HPS 124 supports determinations or measurements of distance, presence, and/or attentiveness, etc.), etc., and/or a combination thereof.

In the illustrated example of FIG. 1, the display SoC 126 is in communication with and/or coupled to the HDL 128. In this example, the display SoC 126 generates the example HPD signal (e.g., a panel HPD signal) 140. The HPD signal 140 of this example is a connection status signal representative of and/or otherwise corresponding to whether the first display panel 104 and the main SoC 108 are in communication with and/or otherwise connected to each other. Additionally or alternatively, the HPD signal 140 of this example may be a power connection signal representative of and/or otherwise corresponding to whether the first display panel 104 and the main SoC 108 are powered and connected to each other. For example, the HPD signal 140 is a first value (e.g., a logic one, a first voltage, a first current, etc.) in response to the display SoC 126 and the main SoC 108 being powered and connected to each other. In other examples, the HPD signal 140 is a second value (e.g., a logic zero, a second voltage, a second current, etc.) in response to the display SoC 126 and the main SoC 108 being unpowered and/or when the main SoC 108 and the display SoC 126 are disconnected.

In some examples, the HDL 128 compares the HPS signal 132 and the HPD signal 140 and generates an example HDL signal 142 based on the comparison. In such examples, the HDL 128 is implemented by at least a comparator (e.g., a comparator circuit, a comparator logic circuit, etc.) to compare the HPS signal 132 and the HPD signal 140 to generate the HDL signal 142. The HDL signal 142 of this example is a control signal indicative of a desired or intended adjustment of a power state of a display panel, such as the first display panel 104. For example, the HDL 128 generates a first value for the HDL signal 142 in response to determining that (1) the display SoC 126 is connected to the main SoC 108 based on the HPD signal 140 and (2) the HPS 124 detects the human 130. In some examples, the HDL 128 generates a second value for the HDL signal 142 in response to determining that (1) the display SoC 126 is connected to the main SoC 108 based on the HPD signal 140 and (2) the HPS 124 does not detect the human 130. In some examples, the HDL 128 generates the second value for the HDL signal 142 in response to determining that the display SoC 126 is not connected to the main SoC 108 based on the HPD signal 140.

In some examples, the display SoC 126 adjusts a power state of the first display panel 104 based on the HPS signal 132. For example, the display SoC 126 reduces an example panel backlight 144 in response to the human 130 not being present based on the HPS signal 132. In other examples, the display SoC 126 increases the panel backlight 144 in response to the human 130 being present based on the HPS signal 132. In such examples, the display SoC 126 adjusts whether to generate pulse-width modulation (PWM) signals to control the panel backlight 144, control presentation of video data, frames, etc., on the first display panel 104, etc.

In some examples, the display SoC 126 adjusts a power state of the first display panel 104 based on the HPS data 138. For example, the display SoC 126 reduces the panel backlight 144 in response to the human 130 not being present based on the HPS data 138. In other examples, the display SoC 126 increases the panel backlight 144 in response to the human 130 being present based on the HPS data 138. In such examples, the display SoC 126 adjusts whether to generate PWM signals to control the panel backlight 144, control presentation of video data, frames, etc., on the first display panel 104, etc.

In some examples, the HDL 128, and/or, more generally, the first display panel 104, instructs and/or otherwise invokes the main SoC 108 to adjust transmission of the display data 127. For example, the HDL 128 transmits the HDL signal 142 to the VDC 120. In such examples, the VDC 120 causes at least one of the CPUS(s) 114 or the GPU(s) 116 to either begin generating or stop generating video data, frames, etc., based on the HDL signal 142. For example, the HDL 128 instructs and/or otherwise invokes the VDC 120 to transmit video data to the first display panel 104 in response to the human 130 being detected. In other examples, the HDL 128 instructs and/or otherwise invokes the VDC 120 to stop or cease transmitting video data to the first display panel 104 in response to the human 130 not being detected.

In some examples, the main SoC 108 enables or disables the first human detection system 102 or portion(s) thereof. For example, the main SoC 108 transmits an enable signal to the display SoC 126 over the AUX channel. In such examples, the display SoC 126 enables at least one of the HPS 124 or the HDL 128 based on the enable signal. In other examples, the main SoC 108 transmits a disable signal to the display SoC 126 over the AUX channel. In such examples, the display SoC 126 disables at least one of the HPS 124 or the HDL 128 based on the disable signal. In some such examples, the main SoC 108 re-enables the at least one of the HPS 124 or the HDL 128. For example, after the disabling of the HPS 124 and/or the HDL 128, the main SoC 108 transmits an enable signal (e.g., a re-enable signal) to the display SoC 126 over the AUX channel. In such examples, the display SoC 126 re-enables at least one of the HPS 124 or the HDL 128.

Advantageously, the main SoC 108 effectuates backwards compatibility for legacy devices. For example, the main SoC 108 queries the display SoC 126 over the AUX channel for whether the first display device 104 includes the first human detection system 102 or portion(s) thereof. In such examples, in response to the first display device 104 not including the first human detection system 102 or portion(s) thereof (e.g., not including the HPS 124, the HDL 128, etc.) based on the query, the main SoC 108 transmits display data for presentation on the first display device 104 (e.g., not based on whether the human 130 is detected). For example, the main SoC 108 operates as described below in connection with the example of FIG. 3. In other examples, in response to the first display device 104 including the first human detection system 102 or portion(s) thereof (e.g., including the HPS 124, the HDL 128, etc.) based on the query, the main SoC 108 transmits display data for presentation on the first display device 104 based on whether the human 130 is detected by the first human detection system 102.

In some examples, the main SoC 108 effectuates backwards compatibility when different display devices are connected to the main SoC 108. For example, in response to the first display device 104 being disconnected from the main SoC 108, the main SoC 108 maintains operation (e.g., executing a host OS without transmitting display data for presentation). In such examples, in response to a second display device being connected to the main SoC 108 that does not include the first human detection system 102 or portion(s) thereof, the main SoC 108 transmits display data for presentation on the second display device (e.g., not based on whether the human 130 is detected). For example, the main SoC 108 operates as described below in connection with the example of FIG. 3.

Figure 2:
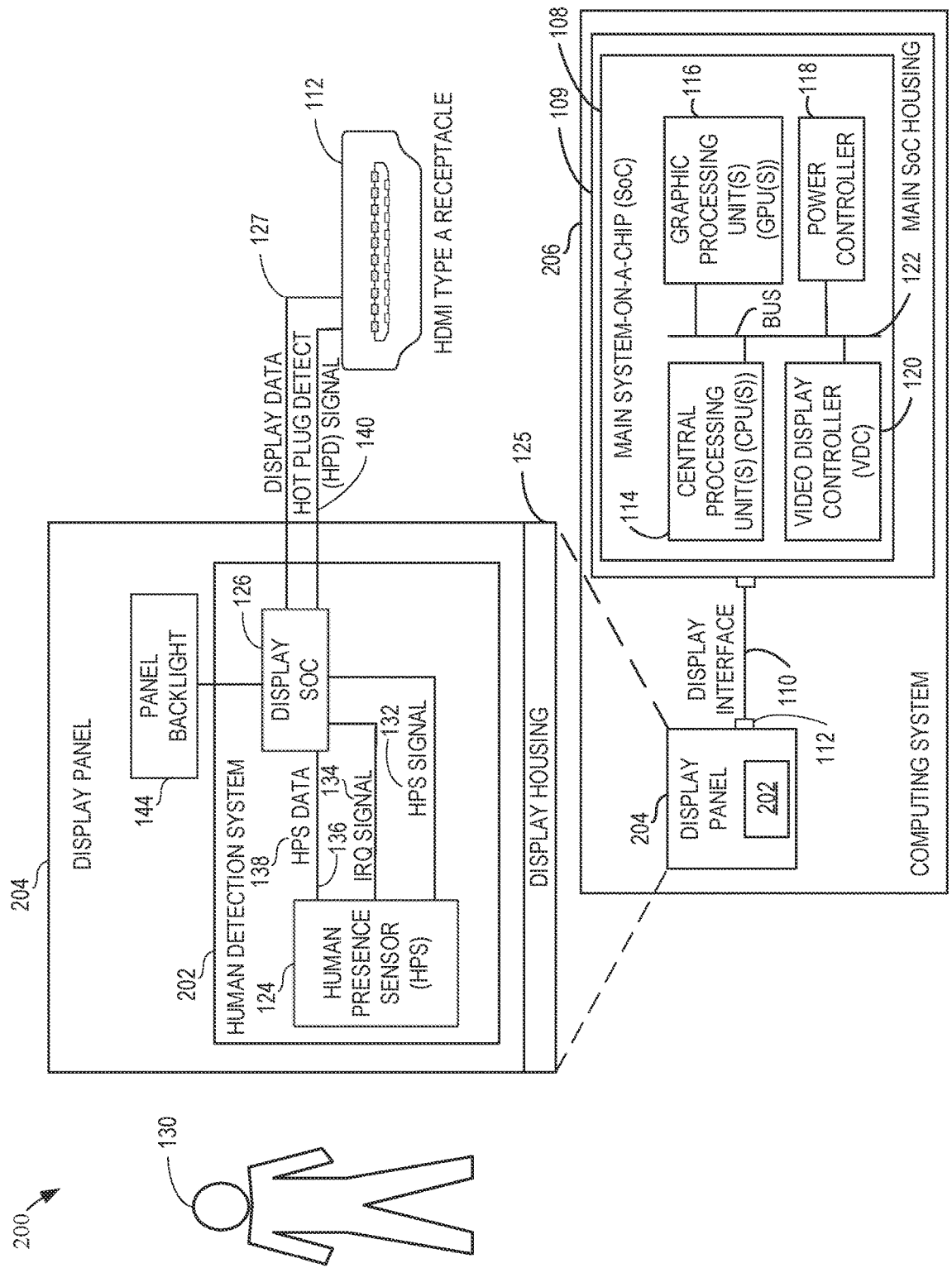
FIG. 2 is a schematic illustration of another example human detection system to facilitate power management of another example display panel.

FIG. 2 is a schematic illustration of a second example computing environment 200 including a second example human detection system 202 included in a second example display panel 204. The second human detection system 202 includes the HPS 124 and the display SoC 126 of FIG. 1. Alternatively, the second display panel 204 may not include the HPS 124 and/or the display SoC 126. For example, the HPS 124 and/or the display SoC 126 may be external to the second display panel 204.

The second computing environment 200 includes a second example computing system 206, which includes the second display panel 204 and the main SoC 108 of FIG. 1. In the example of FIG. 2, the second display panel 204 is coupled to the main SoC 108 via the receptacle 112 and the display interface 110 of FIG. 1.

The second display panel 204 includes the second human detection system 202 to detect whether the human 130 of FIG. 1 is present or absent. The HPS 124 is coupled to the display SoC 126. In this example, the HPS 124 transmits the HPS signal 132 of FIG. 1. In this example, the HPS 124 transmits the HPS data 138 to the display SoC 126 via the bus 136.

In some examples, the HPS 124 generates the HPS signal 132 to be indicative of human detection in response to detecting the human 130. In such examples, the HPS 124 transmits the HPS signal 132 to the display SoC 126. In some such examples, the display SoC 126 queries the HPS 124 for the HPS data 138 and, in response to the query, the HPS 124 transmits the HPS data 138 to the display SoC 126. In some examples, the HPS 124 transmits the display data 127 to the main SoC 108 with the help of display SoC 126. For example, in response to the display SoC 126 receiving the HPS data 138, the display SoC 126 transmits the display data 127 to the main SoC 108, where the display data 127 includes one or more portions of the HPS data 138. In some examples, the display SoC 126 of the second human detection system 202 generates the display data 127 to include at least one of (1) first data based on and/or otherwise including the HPS signal 132 or (2) second data based on and/or otherwise including the HPS data 138. For example, the display SoC 126 transmits the display data 127 over the AUX channel of the display interface 110.

In some examples, the main SoC 108 determines whether to adjust a power state of the display panel 204 based on the display data 127, which includes the HPS data 138. For example, the power controller 118 of the main SoC 108 generates, maintains, and/or updates power profile(s) (e.g., power management profile(s)) associated with at least one of the first display panel 104 of FIG. 1, the second display panel 204 of FIG. 1, and/or portion(s) thereof, such as the HPS 124, the display SoC 126, etc. In such examples, the power profile includes one or more policies, configurations, settings, etc., to effectuate power management of at least one of the first display panel 104 of FIG. 1, the second display panel 204 of FIG. 1, or the portion(s) thereof. For example, the power profile includes power management settings for when to turn on or off the second display panel 204, adjust a brightness level of the second display panel 204, adjust a backlight intensity of the second display panel 204, etc., based on at least the HPS data 138.

In some examples, the power controller 118, and/or, more generally, the main SoC 108, determines to adjust a power state of the second display panel 204 based on the HPS data 138. For example, in response to the power controller 118 determining that the human 130 has been detected based on the HPS data 138, the power controller 118 invokes at least one of the CPU(s) 114 or the GPU(s) 116 to generate video data to be rendered and/or otherwise presented on the second display panel 204. In such examples, the VDC 120 transmits the video data to the display SoC 126 as the display data 127. In other examples, in response to the power controller 118 determining that the human 130 has not been detected based on the HPS data 138, the power controller 118 invokes at least one of the CPU(s) 114 or the GPU(s) 116 to stop generating video data. In such examples, the VDC 120 stops transmitting the video data to the display SoC 126 as the display data 127.

In some examples, the main SoC 108 enables or disables the second human detection system 202 or portion(s) thereof. For example, the main SoC 108 transmits an enable signal to the display SoC 126 over the AUX channel. In such examples, the display SoC 126 enables the HPS 124 based on the enable signal. In other examples, the main SoC 108 transmits a disable signal to the display SoC 126 over the AUX channel. In such examples, the display SoC 126 disables the HPS 124 based on the disable signal. In some such examples, the main SoC 108 re-enables the HPS 124. For example, after the disabling of the HPS 124, the main SoC 108 transmits an enable signal (e.g., a re-enable signal) to the display SoC 126 over the AUX channel. In such examples, the display SoC 126 re-enables the HPS 124.

Advantageously, the main SoC 108 effectuates backwards compatibility for legacy devices. For example, the main SoC 108 queries the display SoC 126 over the AUX channel for whether the second display device 204 includes the second human detection system 202 or portion(s) thereof. In such examples, in response to the second display device 204 not including the second human detection system 202 or portion(s) thereof (e.g., not including the HPS 124) based on the query, the main SoC 108 transmits display data for presentation on the second display device 204 (e.g., not based on whether the human 130 is detected). For example, the main SoC 108 operates as described below in connection with the example of FIG. 3. In other examples, in response to the second display device 204 including the second human detection system 202 or portion(s) thereof (e.g., including the HPS 124) based on the query, the main SoC 108 transmits display data for presentation on the second display device 204 based on whether the human 130 is detected by second human detection system 202.

In some examples, the main SoC 108 effectuates backwards compatibility when different display devices are connected to the main SoC 108. For example, in response to the second display device 204 being disconnected from the main SoC 108, the main SoC 108 maintains operation (e.g., executing a host OS without transmitting display data for presentation). In such examples, in response to a third display device being connected to the main SoC 108 that does not include the second human detection system 202 or portion(s) thereof, the main SoC 108 transmits display data for presentation on the third display device (e.g., not based on whether the human 130 is detected). For example, the main SoC 108 operates as described below in connection with the example of FIG. 3.

Figure 3:
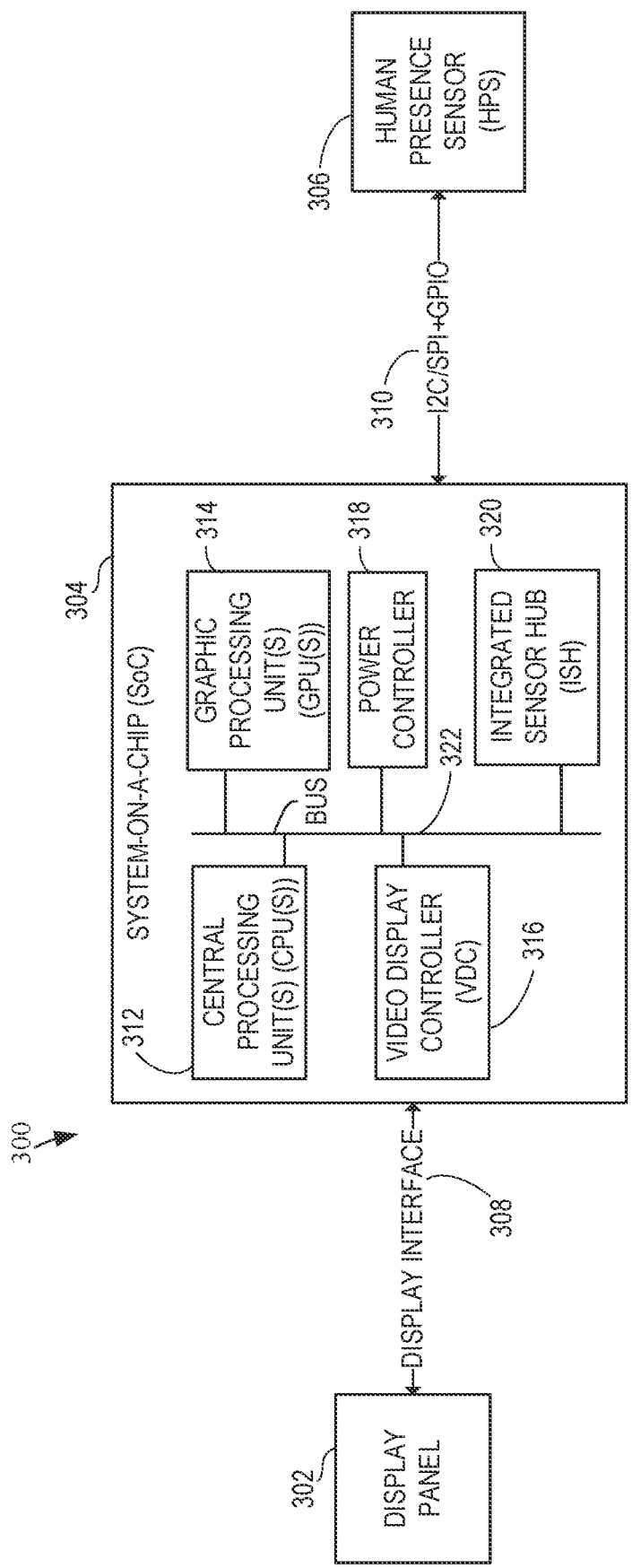
FIG. 3 is a block diagram of host hardware interfacing with a display panel.

FIG. 3 is a block diagram of a third computing system 300 including a third display panel 302, a SoC 304, and an HPS 306. The third display panel 302 is coupled to the SoC 304 with a display interface 308, such as an Embedded DisplayPort (eDP) interface, an HDMI, etc. The HPS 306 is coupled to the SoC 304 with an HPS interface 310. In some examples, the HPS interface 310 may implement one or more interfaces, such as an I2C interface, a SPI interface, and/or a GPIO interface. Additionally or alternatively, the HPS interface 310 may implement a Universal Asynchronous Receiver/Transmitter (UART) interface. In this example, the third display panel 302 is an LED display, an OLED display, an LCD, a CRT display, an IPS display, a touchscreen, etc. In this example, the HPS 306 is an infrared sensor, a time-of-flight laser sensor, an ultrasonic sensor, a millimeter wave radar sensor, or a camera or camera-based sensor. In some examples, the HPS 306 corresponds to the HPS 124 of FIGS. 1 and/or 2.

The SoC 304 is host hardware. In this example, the SoC 304 corresponds to and/or otherwise be representative of one or more programmable processors, hardware logic, one or more hardware peripherals, one or more hardware interfaces, etc., and/or a combination thereof. The SoC 304 includes CPU(s) 312, GPU(s) 314, a VDC 316, a power controller 318, and an integrated sensor hub (ISH) 320. For example, the third display panel 302 is coupled to the VDC 316 via the display interface 308. In other examples, the HPS 306 is be coupled to the ISH 320 via the HPS interface 310. At least one of the CPU(s) 312, the GPU(s) 314, the VDC 316, the power controller 318, or the ISH 320 is coupled to each other via a bus 322. For example, the bus 322 corresponds to at least one of an I2C bus, a SPI bus, or a PCI bus.

In some examples, the CPU(s) 312 correspond(s) to the CPU(s) 114 of FIGS. 1 and/or 2. In some examples, the GPU(s) 314 correspond(s) to the GPU(s) 116 of FIGS. 1 and/or 2. In some examples, the VDC 316 corresponds to the VDC 120 of FIGS. 1 and/or 2. In some examples, the power controller 318 corresponds to the power controller 118 of FIGS. 1 and/or 2.

The HPS 306 is a peripheral device that executes with its own driver and CPU cycles. In some examples, the HPS 306 detects human absence or presence. In some examples, in response to the detection of the human absence or presence, the HPS 306 (and the HPS driver) triggers the host OS of the SoC 304. In some examples, in response to triggering the host OS, the host OS triggers the third display panel 302 to turn on or off via the display interface 308.

The ISH 320 is hardware, firmware, and/or software that manages the operation lifecycle of the HPS 306 and interprets the data from the HPS 306. In some examples, the ISH 320 transfers the data from the HPS 306 to the middleware library or hardware abstraction layer (HAL) of the SoC 304 via a driver (e.g., a device driver, a hardware driver, etc.) running and/or otherwise executing in the OS.

Advantageously, the first human detection system 102 is an improvement over the third computing system 300 of FIG. 3 because the HPS 124 is included in the first display panel 104 and the display SoC 126 does not have to invoke the host OS of the main SoC 108 to read data from the HPS 124 and inform the display SoC 126 to adjust a power state of the first display panel 104. Advantageously, the second human detection system 202 is an improvement over the third computing system 300 of FIG. 3 because the HPS signal 132 is integrated into the HPD signal 140 to inform the main SoC 108 to adjust a power state of the second display panel 204. In such examples, the second human detection system 202 is an improvement because the second display panel 204 includes the HPS 124 while the third display panel 302 may not include the HPS 306 because the third display panel 302 does not have I2C, GPIO, etc., connections to the ISH 320 of the SoC 304 and, thus, the third display panel 302 may not support the HPS 306 being included in the third display panel 302.

Figure 4:
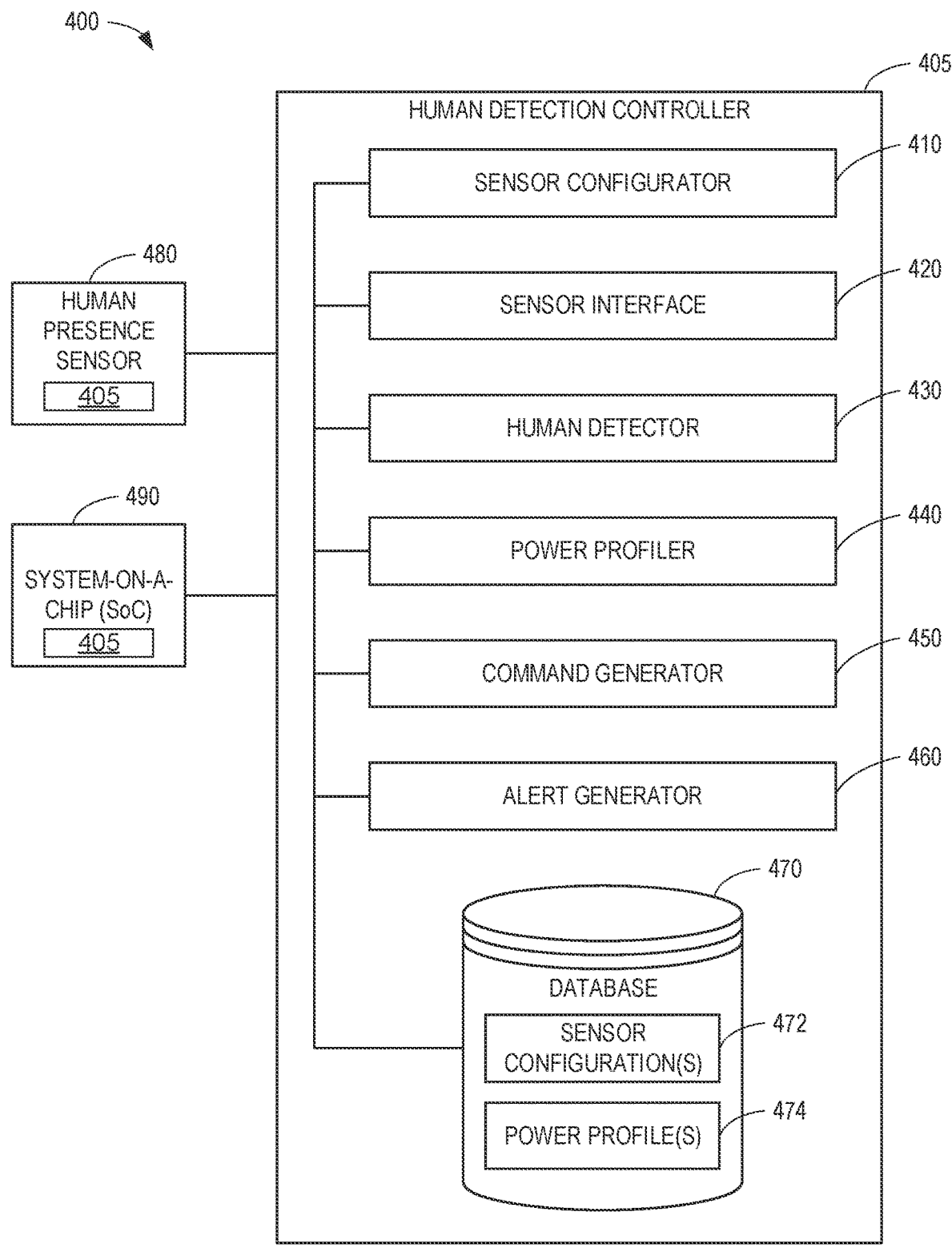
FIG. 4 is a block diagram of an implementation of yet another example human detection system including an example human detection controller to facilitate power management of the example display panel of FIGS. 1 and/or 2.

FIG. 4 is a block diagram of an example implementation of a third example human detection system 400 including a human detection controller 405 to facilitate power management of the first example display panel 104 of FIG. 1 and/or the second example display panel 204 of FIG. 2. The third human detection system 400 of FIG. 4 implements the first human detection system 102 of FIG. 1, the second human detection system 202 of FIG. 2, and/or portion(s) thereof, such as the display SoC 126, the HDL 128, etc., of FIGS. 1 and/or 2. For example, the display SoC 126 of FIGS. 1 and/or 2 may implement the third human detection system 400 or portion(s) thereof.

The third human detection system 400 of the example of FIG. 4 includes the human detection controller 405 to detect an absence or presence of a user, such as the human 130 of FIGS. 1 and/or 2, and adjust a power state of a display device, such as the first display panel 104 and/or the second display panel 204, based on the detection. Advantageously, in some examples, the human detection controller 405 reduces a consumption of power, an execution and/or utilization of hardware, software, and/or firmware resources, etc., of the display device when a user is not detected by the human detection controller 405.

The human detection controller 405 of the example of FIG. 4 includes an example sensor configurator 410, an example sensor interface 420, an example human detector 430, an example power profiler 440, an example command generator 450, an example alert generator 460, and an example database 470, which includes example sensor configuration(s) 472 and example power profile(s) 474. The human detection controller 405 of the example of FIG. 4 is in communication with an example human presence sensor 480 and an example SoC 490. For example, the human detection controller 405 of the example of FIG. 4 may be implemented by the processor platform 1500 of the example of FIG. 15.

In some examples, the human presence sensor 480 of FIG. 4 implements the HPS 124 of FIGS. 1 and/or 2. In some examples, the HPS 480 includes and/or otherwise implements the human detection controller 405 or portion(s) thereof. For example, the HPS 480 may include and/or otherwise implement one or more of the sensor configurator 410, the sensor interface 420, the human detector 430, the power profiler 440, the command generator 450, the alert generator 460, the database 470, the sensor configuration(s) 472, and/or the power profile(s) 474. For example, the human detection controller 405 included in the human presence sensor 480 of the example of FIG. 4 may be implemented by the processor platform 1600 of the example of FIG. 16.

In some examples, the SoC 490 implements the display SoC 126 of FIGS. 1 and/or 2. In some examples, the SoC 490 includes and/or otherwise implements the human detection controller 405 or portion(s) thereof. For example, the SoC 490 may include and/or otherwise implement one or more of the sensor configurator 410, the sensor interface 420, the human detector 430, the power profiler 440, the command generator 450, the alert generator 460, the database 470, the sensor configuration(s) 472, and/or the power profile(s) 474. For example, the human detection controller 405 of included in the SoC 490 may be implemented by the processor platform 1700 of the example of FIG. 17.

The human detection controller 405 of the example of FIG. 4 includes the sensor configurator 410 to initialize (e.g., power initialize), program, modify, and/or otherwise adjust a configuration of the HPS 124 of FIGS. 1 and/or 2. In some examples, the sensor configurator 410 initializes the HPS 124 by invoking the HPS 124 to turn on and begin detection (e.g., begin detection either periodically or asynchronously). In some examples, the sensor configurator 410 transmits a command to the HPS 124 to turn off or stop human presence detection (e.g., when there is an input from an input device, such as a keyboard or mouse input). In some examples, the sensor configurator 410 transmits a command to the HPS 124 to turn on or begin human presence detection (e.g., when there is no keyboard or mouse input).

In some examples, the sensor configurator 410 adjusts one or more parameters (e.g., detection parameters), settings (e.g., detection settings), etc., of the HPS 124 to generate the sensor configuration(s) 472. For example, the sensor configurator 410 configures the HPS 124 based on detection parameters. In such examples, in response to programming the HPS 124 with the sensor configuration(s) 472, the sensor configurator 410 stores the sensor configuration(s) 472 in the database 470. For example, the sensor configurator 410 instructs the HPS 124 to adjust an interval (e.g., a detection interval) when the HPS 124 detects for human presence. In other examples, the sensor configurator 410 programs the HPS 124 to detect human presence at a specific range (e.g., a range of distances), detect a human versus an object (e.g., program the HPS 124 to determine that fixed objects are not real humans), etc. In yet other examples, the sensor configurator 410 programs the HPS 124 to detect an attention level of the human 130.

In some examples, the sensor configurator 410 facilitates an enabling or disabling of the third human detection system 400 or portion(s) thereof. For example, the SoC 490 transmits an enable signal to the human detection controller 405. In such examples, the sensor configurator 410 enables the HPS 480 and/or other component(s) based on the enable signal. In other examples, the SoC 490 transmits a disable signal to the human detection controller 405. In such examples, the sensor configurator 410 disables the HPS 480 and/or other component(s) based on the disable signal. In some such examples, the SoC 490 re-enables the HPS 480 and/or the other component(s). For example, after the disabling of the HPS 480 and/or the other component(s), the SoC 490 transmits an enable signal (e.g., a re-enable signal) to the human detection controller 405. In such examples, the sensor configurator 410 re-enables the HPS 124 and/or the other component(s).

In some examples, the sensor configurator 410 implements means for configuring the HPS 124 based on detection parameters. In such examples, the means for configuring is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

The human detection controller 405 of the example of FIG. 4 includes the sensor interface 420 to receive and/or otherwise obtain data or measurements (e.g., detection data, human presence data, human absence data, human detection data, etc.) from the HPS 124. In some examples, the sensor interface 420 obtains at least one of a distance of the human 130, an indicator of whether the human 130 is present or absent, an indicator of whether the human 130 is attentive, a quantification of how attentive the human 130 is to the presentation of video data on the first display panel 104, the second display panel 204, etc., or a capability of the HPS 124 (e.g., whether the HPS 124 supports distance, presence, and/or attention measurements or determinations).

The human detection controller 405 of the example of FIG. 4 includes the human detector 430 to determine whether an absence or presence of a user, such as the human 130, is detected based on a measurement, detection data, etc., from the HPS 480. In some examples, the human detector 430 indicates whether the human 130 is present based on an indicator (e.g., a detection indicator), a raw signal or raw data, etc., from the HPS 480, etc. IN such examples, the human detector 430 processes the indicator, the raw signal or the raw data, etc., by executing a noise-reduction filter, removing or reducing signal error, etc. In some such examples, the human detector 430 generates a logic high signal (e.g., a voltage representative of a digital '1'), a logic low signal (e.g., a voltage representative of a digital '0'), etc., as the HPS signal 132 of FIGS. 1 and/or 2. In some examples, the human detector 430 determines whether the human 130 is present based on (1) the detection indicator and (2) a presence confidence value from the HPS 124.

In some examples, the human detector 430 starts and/or otherwise triggers a timer (e.g., a change state timer, a change power state timer, etc.) that, when elapsed, causes an adjustment in a power state of the display panel 104, 204 in response to detecting human absence. For example, the sensor interface 420 obtains an alert indicative of the human 130 not being detected. In such examples, instead of changing the power state of the display panel 104, 204 when absence of the human 130 is detected, the human detector 430 improves a user experience associated with the display panel 104, 204 by waiting until a pre-determined time period (e.g., the timer) has elapsed before turning off the display panel 104, 204. In some such examples, the human detector 430 reduces the likelihood of repeatedly toggling the display panel 104, 204 between an on and off power state to avoid a poor or bad user experience.

In some examples, the human detector 430 implements means for triggering a timer. In such examples, the means for triggering is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the human detector 430 determines whether the human 130 is attentive to the first display panel 104, the second display panel 204, etc., and, if so, a quantification or representation of how attentive the human 130 is to the first display panel 104, the second display panel 204, etc. For example, the HPS 124 transmits attention data (e.g., human attention data) including an attention level value (e.g., a value in a range of 0-2 with 0 being representative of the human 130 being fully attentive and 2 being representative of the human 130 being less than fully attentive, a value in a range of 0-100% with 0% being representative of the human 130 not being attentive and 100% being representative of the human 130 being fully attentive, etc.). In such examples, the HPS 124 transmits an attention level value of 0 when the HPS 124 detects that the human 130 is looking at the display panel 104, 204, an attention level value of 1 when the HPS 124 detects that a face of the human 130 is in a range of 45-90 degrees to the display panel 104, 204, an attention level value of 2 when the HPS 124 detects that the face is greater than 90 degrees to the display panel 104, 204, etc. In some such examples, the transmissions from the HPS 124 are implemented as the HPS data 138. For example, the HPS data 138 may implement and/or otherwise include the attention level.

The human detection controller 405 of the example of FIG. 4 includes the power profiler 440 to generate and/or adjust the power profile(s) 474. The power profile(s) 474 include, correspond to, and/or otherwise representative of one or more power management profiles of at least one of the first display panel 104, the second display panel 204, and/or portion(s) thereof, such as the HPS 124, the display SoC 126, etc. In some examples, the power profiler 440 generates the power profile(s) 474 to determine when to adjust a power state of the display panel 104, 204, such as determining when to turn on or off the display panel 104, 204, adjust a brightness or backlight intensity of the display panel 104, 204, etc. For example, the power profiler 440 generates the power profile(s) 474 that specify triggering a timer that, when elapsed, causes an adjustment in a power state of the display panel 104, 204 in response to detecting human absence. In other examples, the power profiler 440 generates the power profile(s) 474 that specify turning on the display panel 104, 204 in response to detecting human presence, turning off the display panel 104, 204 in response to detecting human absence, etc.

The human detection controller 405 of the example of FIG. 4 includes the command generator 450 to generate a command, a direction, an instruction, an invocation, etc., to adjust a power state of the first display panel 104 and/or the second display panel 204. In some examples, the command generator 450 generates a command to turn on or off the display panel 104, 204. For example, the command generator 450 generates a command to invoke the display SoC 126 to stop generating the PWM signals to control the panel backlight 144 of FIGS. 1 and/or 2 and turn off power to the display panel 104, 204. In other examples, the command generator 450 generates an instruction to direct the display SoC 126 to adjust a brightness, a backlight intensity, etc., of the display panel 104, 204. In yet other examples, the command generator 450 transmits a command (e.g., a deassertion of the HDL signal 142) to the main SoC 108 of FIG. 2 to invoke the VDC 120 of FIGS. 1 and/or 2 to stop and/or otherwise cease transmitting the display data 127 to the display SoC 126.

In some examples, the command generator 450 implements means for generating (e.g., second means for generating) a control signal to cause an adjustment of a power state of the display device 104, 204 based on the detection signal (e.g., the HPS signal 132). In some examples, the second means for generating is to generate the control signal to reduce a backlight intensity of the display device 104, 204 or turn off the display device 104, 204. In some examples, the second means for generating is to determine that the detection signal is indicative of a presence of the human 130 proximate the display device 104, 204 or indicative of an absence of the human 130 proximate the display device 104, 204, and determine that a connection status signal (e.g., the HPD signal 140) indicates the display device 104, 204 is in communication with host hardware (e.g., the main SoC 108). In some examples, the command generator 450 implements means for turning off the display device 104, 204 in response to a timer elapsing (e.g., a change state timer, a change power state timer, etc.). In such examples, the means for turning is to turn off the display device 104, 204 in response to the tier elapsing without the detection signal changing indication of an absence of the human 130. In some such examples, the second means for generating and/or the means for turning off is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

The human detection controller 405 of the example of FIG. 4 includes the alert generator 460 to generate an alert, an indicator, etc., representative of whether the human 130 is present or absent. For example, the alert, the indicator, etc., implements the HPS signal 132, the IRQ signal 134, the HPD signal 140, and/or the HDL signal 142 of FIGS. 1 and/or 2. In some examples, the alert generator 460 generates an alert in response to whether the human 130 is detected. For example, the alert generator 460 generates the HPS signal 132 to have a first value indicative of human presence, a second value indicative of human absence, etc. In such examples, the alert generator 460 generates the IRQ signal 134. In some examples, the alert generator 460 generates an alert in response to detecting whether the display panel 104, 204 is powered and connected to the main SoC 108. For example, the alert generator 460 generates the HPD signal 140 to be indicative of (1) being powered and connected to the main SoC 108 or (2) not being powered and/or not connected to the main SoC 108. In some examples, the alert generator 460 generates an alert based on (1) whether the human 130 is detected and (2) whether the display panel 104, 204 is powered and connected to the main SoC 108. For example, the alert generator 460 generates the HDL signal 142 based on at least one of the HPS signal 132 or the HPD signal 140.

In some examples, the alert generator 460 implements means for generating (e.g., first means for generating) a detection signal based on whether a human is detected. In such examples, the first means for generating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the alert generator 460 implements means for asserting a connection status signal (e.g., the HPD signal 140) in response to detecting that the display device 104, 204 is in communication with host hardware (e.g., the main SoC 108). In some examples, the alert generator 460 implements means for de-asserting the connection status signal in response to detecting that the display device 104, 204 is in communication with the host hardware. In some examples, the alert generator 460 implements means for generating (e.g., third means for generating) the connection status signal in response to detecting that the display device 104, 204 is in communication with the host hardware. In such examples, the means for asserting, the means for de-asserting, and/or the third means for generating is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the alert generator 460 implements means for transmitting a control signal (e.g., the HDL signal 142) to the host hardware to cease transmission of display data (e.g., the display data 127) from the host hardware to the display device 104, 204. In some examples, the means for transmitting is to transmit at least one of the detection parameters or the detection signal (e.g., the HPS signal 132) to the host hardware in communication with the display device 104, 204. In such examples, the means for transmitting is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

The human detection controller 405 of the example of FIG. 4 includes the database 470 to record data (e.g., the sensor configuration(s) 472, the power profile(s) 474, etc.). In some examples, the database 470 is implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 470 may additionally or alternatively be implemented by one or more double data rate (DDR) memories, such as DDR, DDR2, DDR3, DDR4, mobile DDR (mDDR), etc. The database 470 may additionally or alternatively be implemented by one or more mass storage devices such as hard disk drive(s), compact disk (CD) drive(s), digital versatile disk (DVD) drive(s), solid-state disk drive(s), etc. While in the illustrated example the database 470 is illustrated as a single database, the database 470 may be implemented by any number and/or type(s) of databases. Furthermore, the data stored in the database 470 may be in any data format such as, for example, binary data, comma delimited data, tab delimited data, structured query language (SQL) structures, etc.

Advantageously, the SoC 490 effectuates backwards compatibility for legacy devices. For example, the SoC 490 queries a display SoC, such as the display SoC 126 of FIGS. 1 and/or 2 over an AUX channel for whether a display device includes the third human detection system 400 or portion(s) thereof. In such examples, in response to the display device not including the third human detection system 400 or portion(s) thereof (e.g., not including the HPS 480) based on the query, the SoC 490 transmits display data for presentation on the display device (e.g., not based on whether the human 130 is detected). For example, the SoC 490 operates as described above in connection with the example of FIG. 3. In other examples, in response to the display device including the third human detection system 400 or portion(s) thereof (e.g., including the HPS 480) based on the query, the SoC 490 transmits display data for presentation on the display device 104 based on whether the human 130 is detected by the third human detection system 400.

In some examples, the SoC 490 effectuates backwards compatibility when different display devices are connected to the main SoC 490. For example, in response to a display device being disconnected from the SoC 490, the SoC 490 maintains operation (e.g., executing a host OS without transmitting display data for presentation). In such examples, in response to a second display device being connected to the SoC 490 that does not include the third human detection system 400 or portion(s) thereof, the SoC 490 transmits display data for presentation on the second display device (e.g., not based on whether the human 130 is detected). For example, the SoC 490 operates as described above in connection with the example of FIG. 3.

While an example manner of implementing the first human detection system 102 and/or the second human detection system 202 of FIG. 2 is illustrated in FIG. 4, one or more of the elements, processes and/or devices illustrated in FIG. 4 may be combined, divided, re-arranged, omitted, eliminated and/or implemented in any other way. Further, the example sensor configurator 410, the example sensor interface 420, the example human detector 430, the example power profiler 440, the example command generator 450, the example alert generator 460, the example database 470, the example sensor configuration(s) 472, the example power profile(s) 474, and/or, more generally, the example human detection controller 400, and/or, more generally, the third example human detection system 400 of FIG. 4, may be implemented by hardware, software, firmware and/or any combination of hardware, software and/or firmware. Thus, for example, any of the example sensor configurator 410, the example sensor interface 420, the example human detector 430, the example power profiler 440, the example command generator 450, the example alert generator 460, the example database 470, the example sensor configuration(s) 472, the example power profile(s) 474, and/or, more generally, the example human detection controller 405, and/or, more generally, the third example human detection system 400, could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor configurator 410, the example sensor interface 420, the example human detector 430, the example power profiler 440, the example command generator 450, the example alert generator 460, the example database 470, the example sensor configuration(s) 472, the example power profile(s) 474, and/or, more generally, the example human detection controller 400, is/are hereby expressly defined to include a non-transitory computer readable storage device or storage disk such as a memory, a DVD, a CD, a Blu-ray disk, etc. including the software and/or firmware. Further still, the third example human detection system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figures 5A, 5B:
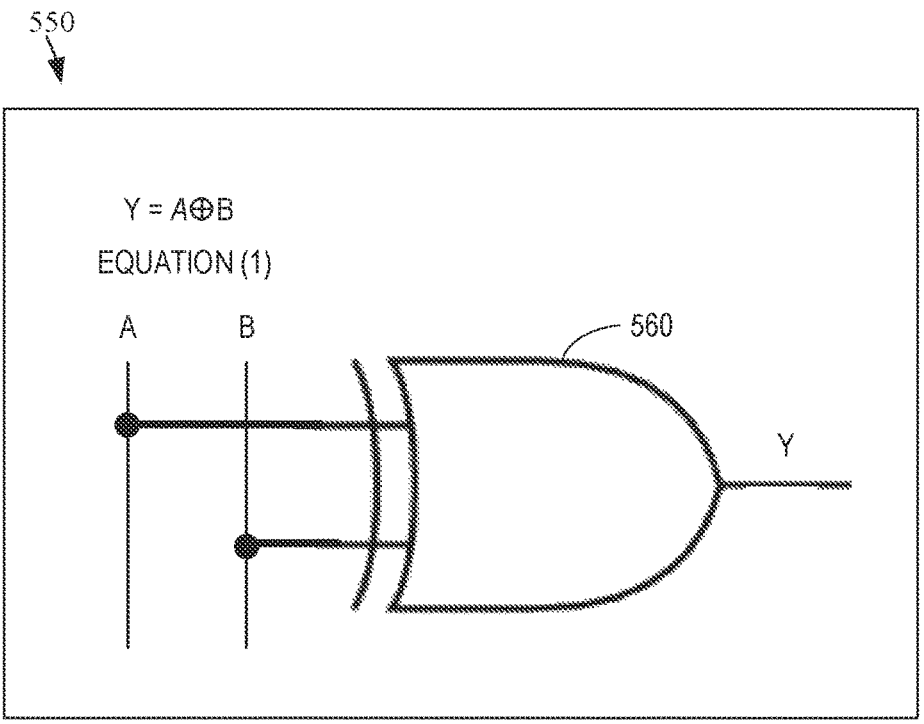
FIG. 5A depicts an example truth table.
FIG. 5B is a schematic illustration of an example control circuit that may implement the example human detection logic circuit of FIG. 1 and/or the example human detection controller of FIG. 4 in accordance with the logic reflected in the example truth table of FIG. 5A.

FIG. 5A depicts an example truth table 500 reflecting example input and output relationships for the HDL 128 of FIG. 1. The truth table 500 includes a first example column 510 representative of Boolean values for input A, which corresponds to the HPS signal 132 of FIG. 1. The truth table 500 includes a second example column 520 representative of Boolean values for input B, which corresponds to the HPD signal 140 of FIG. 1. The truth table 500 includes a third example column 530 representative of Boolean values for output Y, which corresponds to the HDL signal 142 of FIG. 1. Thus, a "1" represents "true" and a "0" represents "false".

In the first column 510 of the example truth table 500 of FIG. 5, the Boolean value of "0" represents that a human, such as the human 130 of FIG. 1, is present, while a Boolean value of "1" represents that the human is absent with respect to the first display panel 104 of FIG. 1. In the second column 520 of the example truth table 500 of FIG. 5, the Boolean value of "1" represents that a panel, such as the first display panel 104, is connected to host hardware, such as the main SoC 108 of FIG. 1, while a Boolean value of "0" represents that the panel is disconnected from the host hardware. For example, the first display panel 104 is disconnected when the first display panel 104 is physically disconnected from the main SoC 108. In other examples, the first display panel 104 is disconnected when the first display panel 104 is in a power off mode while the main SoC 108 is powered on. In yet other examples, the first display panel 104 is disconnected when the first display panel 104 is powered on while the main SoC 108 is in a power off mode.

In some examples, the HDL signal has a value of "1" in response to the HPS having a value of "0" and the HPD signal having a value of "1." In such examples, the HDL signal having the value of "1" is representative of (1) the HPS 124 of FIG. 1 detecting that the human 130 is present and (2) the display SoC 126 of FIG. 1 determining that the display SoC 126 is connected to the main SoC 108 via the display interface 110 of FIG. 1.

In some examples, the HDL signal has a value of "0" in response to the HPS having a value of "1" and the HPD signal having a value of "1." In such examples, the HDL signal having the value of "0" is representative of (1) the HPS 124 of FIG. 1 detecting that the human 130 is absent and (2) the display SoC 126 of FIG. 1 determining that the display SoC 126 is connected to the main SoC 108 via the display interface 110 of FIG. 1.

In some examples, the HDL signal has a value of "0" in response to the HPS having a value of "0" and the HPD signal having a value of "0." In such examples, the HDL signal having the value of "0" is representative of the display SoC 126 of FIG. 1 determining that the display SoC 126 is not connected to the main SoC 108 via the display interface 110 of FIG. 1. In some such examples, the detection of the human 130 does not impact the output because the display SoC 126 is not connected to the main SoC 108.

FIG. 5B is a schematic illustration of an example control circuit 550 implementing the HDL 128 of FIG. 1, the first human detection system 102 of FIG. 1, and/or the human detection controller 405 of FIG. 4, in accordance with the logic reflected in the example truth table 500 of FIG. 5A. The control circuit 550 of the example of FIG. 5B is implemented using a logic gate corresponding to the example truth table 500 of FIG. 5A. For example, using truth table conversion methods such as generating and analyzing Karnaugh maps, performing Boolean algebra, etc., an example Boolean expression as described in Equation (1) of FIG. 5B is generated to represent the relationships described in the truth table 500 of FIG. 5A.

Alternatively, other Boolean expressions may be generated based on the truth table 500 of FIG. 5A. In the illustrated example of Equation (1), input A corresponds to a value of the HPS signal of the first column 510, input B corresponds to a value of the HPD signal of the second column 520, and the output Y corresponds to a value of the HDL signal of the third column 530. In the illustrated example of FIG. 5B, the control circuit 550 is implemented by an XOR gate 560. The XOR gate 560 of the illustrated example represents a Boolean operator that generates the output Y based on the inputs A and B. Alternatively, additional and/or different types of logic gates may be used to implement the truth table 500 of FIG. 5A.

FIG. 6 depicts an example logic table 600 reflecting example input and output relationships for example operating conditions associated with the second human detection system 202 of FIG. 2 and/or the human detection controller 405 of FIG. 4. The logic table 600 includes a first example column 610 representative of Boolean values for an HPS signal, which corresponds to the HPS signal 132 of FIG. 2. The logic table 600 includes a second example column 620 representative of Boolean values for an HPD signal, which corresponds to the HPD signal 140 of FIG. 2. The logic table 600 includes a third example column 630 representative of Boolean values for a decision made by host hardware, which corresponds to an output generated by the main SoC 108 of FIG. 2. For example, the main SoC 108 transmits the decision via an AUX channel of a display interface, such as the display interface 110 of FIG. 2. Thus, a "1" represents "true," a "0" represents "false," and an "X" represents "don't care." In the don't care condition, the corresponding input has no effect on the resulting output.

In the first column 610 of the example logic table 600 of FIG. 6, the Boolean value of "0" represents that a human, such as the human 130 of FIG. 2, is present, while a Boolean value of "1" represents that the human is absent with respect to the second display panel 204 of FIG. 2. In the second column 620 of the example logic table 600 of FIG. 6, the Boolean value of "1" represents that a panel, such as the second display panel 204 of FIG. 2, is connected to host hardware, such as the main SoC 108 of FIGS. 1 and/or 2, while a Boolean value of "0" represents that the panel is disconnected from the host hardware.

In some examples, the host hardware decision has a value of "1" in response to the HPS having a value of "0" and the HPD signal having a value of "1." In such examples, the host hardware decision having the value of "1" is representative of the main SoC 108 determination to have the second display panel 204 remain connected to the main SoC 108 based on (1) the HPS 124 of FIGS. 1 and/or 2 detecting that the human 130 is present and (2) the display SoC 126 of FIGS. 1 and/or 2 determining that the display SoC 126 is connected to the main SoC 108 via the display interface 110 of FIGS. 1 and/or 2.

In some examples, the host hardware decision has a value of "0" in response to the HPS having a value of "0" and the HPD signal having a value of "0." In such examples, the host hardware decision having the value of "0" is representative of the main SoC 108 determination to have the second display panel 204 remain connected to the main SoC 108 even in response to the HPS 124 of FIGS. 1 and/or 2 detecting that the human 130 is absent. In some such examples, the main SoC 108 compares at least one of the HPS signal 132 or the HPD signal 140 to a power management profile in the host OS. For example, the main SoC 108 determines to maintain the power state of the second display panel 204 to be in an enabled, powered, and/or otherwise "ON" state.

In some examples, the main SoC 108 determines the host hardware decision by executing system wide power policy management. For example, the main SoC 108 obtains sensor information from the HPS 124 as the display data 127 over an AUX channel of an interface, such as the display interface 110. In some examples, the main SoC 108 executes a system wide power policy framework (e.g., based on the display data 127) and manages the power of a computing system, such as the second computing system 206 of FIG. 2, in a way the main SoC 108 wants to conserve or save power, conserve or save compute power, change a priority of tasks (e.g., computing tasks) that are running, pause or stop the generation and/or presentation of audio and/or video data, transition the second computing system 206 into a power state (e.g., an Intel® SOix state), etc.

If the main SoC 108 determines to ignore the human absence event (e.g., the main SoC 108 determines the human absence event to not be substantial enough to put the second computing system 206 in a low power state), then the main SoC 108 communicates back to the display SoC 126 over an AUX channel regarding the host hardware decision. If the main SoC 108 determines to execute an action in response to the human absence event (e.g., the main SoC 108 determines the human absence event is substantial enough to put the second computing system 206 in a low power state), then the main SoC 108 communicates back to the display SoC 126 over an AUX channel regarding the host hardware decision. For example, the main SoC 108 sends an update to the display SoC 126 that the main SoC 108 is to stop sending video frames (e.g., any video frames) to the second display panel 204 and that the display SoC 126 can shut down the second display panel 204 or enter into a lower power state. In such examples, the display SoC 126 executes and/or otherwise performs a power optimization sequence. For example, the display SoC 126 pulls low the HPD signal 140 over the display interface 110 to notify the main SoC 108, so that the main SOC 108 can turn off the second display panel 204 as if the second display panel 204 was physically disconnected, unplugged, etc. Accordingly, the display SoC 126 resets the HPS 124 to transition the HPS 124 from a human absence detection state to a human presence detection state.

In some examples, in response to turning off the second display panel 204 or entering a low power state, the HPS 124 detects human presence and notifies the display SoC 126. The display SoC 126 toggles (e.g., pulls high) the HPD signal 140 on the display interface 110 to notify the main SoC 108 that the main SoC 108 can turn on the second display panel 204 as if the second display panel 204 was physically connected, plugged in, etc. The display SoC 126 transmits the change in human presence to the main SoC 108 over the AUX channel of the display interface 110. In some examples, the main SoC 108 queries the display SoC 126 for additional information, such as the HPS data 138. In some examples, the main SoC 108 executes the system wide power policy management based on at least the HPS data 138 obtained from the display SoC 126 via the AUX channel. In such examples, the main SoC 108 executes the system wide power policy framework and enable systems that were put into a lower power mode, change a priority of tasks (e.g., computing tasks) that are running, begin or trigger the generation and/or presentation of audio and/or video data, transition the second computing system 206 into a power state (e.g., an Intel® SOix state), etc. In such examples, the main SoC 108 transmits an update to the display SoC 126 via the AUX channel and establish a link with the second display panel 204 to begin or start sending display frames to the display SoC 126. In some such examples, the display SoC 126 executes its standard operation to establish the display panel link and start displaying the display frames sent from the main SoC 108. Accordingly, the display SoC 126 resets the HPS 124 to transition the HPS 124 from a human presence detection state to a human absence detection state.

Figure 7:
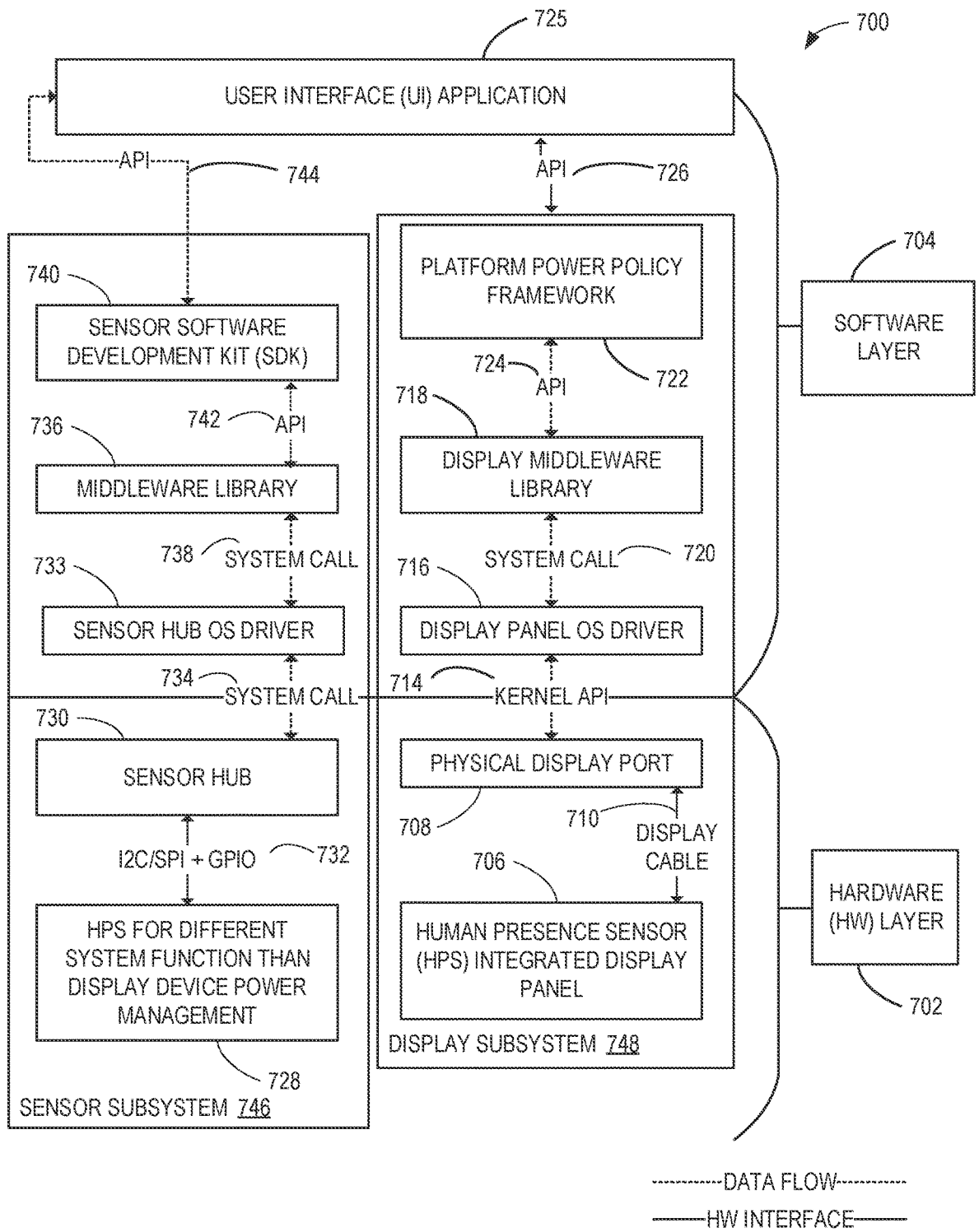
FIG. 7 is a block diagram of example data flow across an example hardware layer and example software layer associated with the example human detection system of FIGS. 1 and/or 2.

FIG. 7 is a block diagram of example data flow 700 across an example hardware layer (e.g., a hardware stack) 702 and an example software layer (e.g., an OS layer, an OS stack, etc.) 704 associated with the first example human detection system 102 of FIGS. 1, the second example human detection system 202 of FIG. 2, and/or the third example human detection system 400 of FIG. 4. In the example of FIG. 7, an example HPS integrated display panel 706, such as the first display panel 104 of FIG. 1 and/or the second display panel 204 of FIG. 2, transmits first HPS data (e.g., an alert or indicator of human absence or detection, detection parameters, etc.) to a physical display port (e.g., a physical display hardware port) 708 via an example display cable 710, such as an HDMI cable or an eDP cable. In some examples, the HPS integrated display panel 706 transmits the HDL signal 142 to the physical display port 708. In some examples, the HPS integrated display panel 706 transmits the HPD signal 140 and the display data 127, which can include the HPS signal 132, the HPS data 138, etc. For example, the physical display port 708 may implement the receptacle 112 of FIGS. 1 and/or 2. The hardware layer 702 of the example of FIG. 7 includes the HPS integrated display panel 706 and the physical display port 708.

In the example of FIG. 7, the physical display port 708 transmits the first HPS data from the display panel 706 of the hardware layer 702 to an example display panel OS driver 712 of the software layer 704 via an example kernel application programming interface (API) 714. The display panel OS driver 716 transmits the first HPS data to an example display middleware library 718 via an example system call 720. For example, the display middleware library 718 may be implemented by the VDC 120 of FIGS. 1 and/or 2. The display middleware library 718 transmits the first HPS data to an example platform power policy framework 722 via an example API 724. The platform power policy framework 722 transmits the first HPS data to an example user interface (UI) application 725 via an example API 726. For example, the UI application 725 is executed and/or otherwise presented to a user, such as the human 130 of FIGS. 1 and/or 2.

In the example of FIG. 7, an example HPS 728, such as the HPS 124 of FIGS. 1 and/or 2, transmits second HPS data (e.g., an alert or indicator of human absence or detection) to an example sensor hub 730 via example interfaces 732, such as an I2C, SPI, and/or GPIO interface. For example, the sensor hub 730 corresponds the ISH 320 of FIG. 3. The HPS 728 of FIG. 7 is not included in the HPS integrated display panel 706. For example, the HPS 728 is used for a different system function than determining whether to adjust a power state of the first display panel 104. The sensor hub 730 transmits the second HPS data to an example sensor hub OS driver 733 via an example system call 734. The sensor hub OS driver 733 transmits the second HPS data to an example middleware library 736 via an example system call 738. The middleware library 736 transmits the second HPS data to an example sensor software development kit (SDK) 740 via an example API 742. The sensor SDK 740 transmits the second HPS data to the UI application 725 via an example API 744.

In some examples, the HPS integrated display panel 706 adjusts a power state of the HPS integrated display panel 706 based on the first HPS data. In such examples, the platform power policy framework 722 determines to adjust a transmission of video data to the first display panel 104 and/or the second display panel 204 based on the first HPS data obtained via the data flow depicted in the example of FIG. 7. Advantageously, in some examples, the HPS integrated display panel 706 adjusts the power state of the first display panel 104 independently from host hardware, such as the main SoC 108 of FIGS. 1 and/or 2. For example, there is no communication in the example of FIG. 7 between the sensor subsystem 746 and the display subsystem 748 for human presence detection. Advantageously, in some examples, the HPS integrated display panel 706 adjusts the power state of the second display panel 204 in conjunction with host hardware, such as the main SoC 108 of FIGS. 1 and/or 2. For example, there is no communication in the example of FIG. 7 between the sensor subsystem 746 and the display subsystem 748 for human presence detection.

Figure 8:
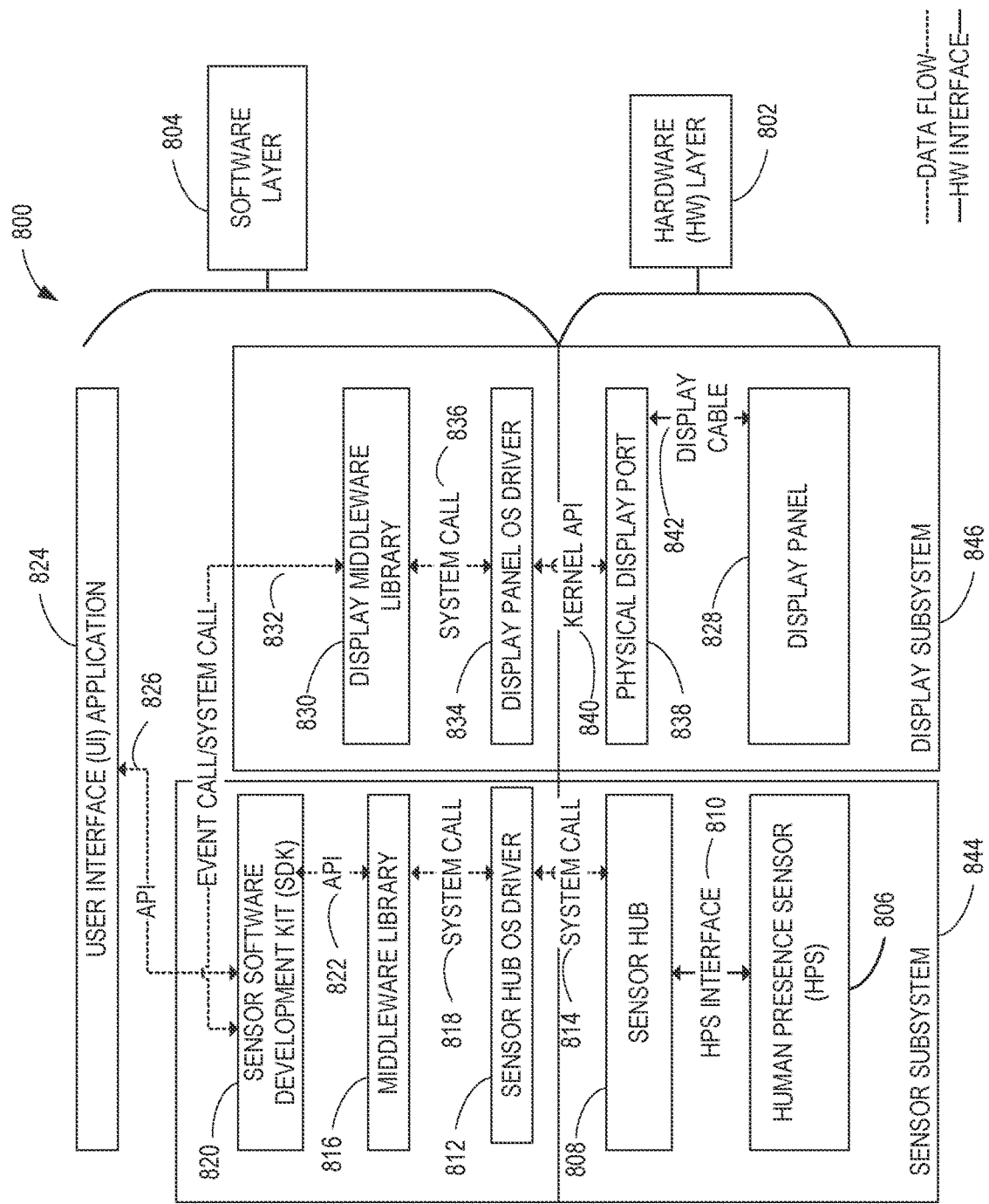
FIG. 8 is a block diagram illustrating data flow across a hardware layer and a software layer associated with the host hardware of FIG. 3.

FIG. 8 is a block diagram of example data flow 800 across an example hardware layer (e.g., a hardware stack) 802 and an example software layer (e.g., an OS layer or stack) 804 associated with the third computing system 300 of FIG. 3. In the example of FIG. 8, an HPS 806, such as the HPS 306 of FIG. 3, transmits HPS data (e.g., an alert or indicator of human absence or detection, detection parameters, etc.) to a sensor hub 808, such as the ISH 320 of FIG. 3, via an HPS interface 810, such as the HPS interface 310 of FIG. 3. For example, the HPS interface 810 may be implemented by an I2C interface, a SPI interface, and/or a GPIO interface.

In the example of FIG. 8, the sensor hub 808 transmits the HPS data to a sensor hub OS driver 812 via a system call 814. The sensor hub OS driver 812 transmits the HPS data to a middleware library 816 via a system call 818. The middleware library 816 transmits the HPS data to a sensor SDK 820 via an API 822. The sensor SDK 820 transmits the HPS data to a UI application 824 via an API 826.

The sensor SDK 820 determines to adjust a power state of a display panel 828 based on the HPS data. For example, the sensor SDK 820 determines to turn off the display panel 828 in response to the HPS 806 detecting that a user is not present, turn on the display panel 828 in response to the HPS 806 detecting that the user is present, etc. The sensor SDK 820 generates a display control command indicative of the determination.

The sensor SDK 820 transmits the display control command to a display middleware library 830 via an event or system call 832. The display middleware library 830 transmits the display control command to a display panel OS driver 834 via a system call 836. The display panel OS driver 834 transmits the display control command to a physical display port 838 via a kernel API 840. The physical display port 838 transmits the display control command to the display panel 828 via a display cable 842, such as the display interface 308 of FIG. 3. In response to the display panel 828 receiving the display control command, the display panel 828 adjusts a power state of the display panel 828 based on the display control command.

Advantageously, the first human detection system 102 of FIG. 1, the second human detection system 202 of FIG. 2, and/or the third human detection system 400 of FIG. 4 are improvement(s) over the third computing system 300 of FIG. 3 because a sensor subsystem 844 has to receive the HPS data to control a display subsystem 846. Advantageously, the first human detection system 102 of FIG. 1, the second human detection system 202 of FIG. 2, and/or the third human detection system 400 of FIG. 4 adjusts a power state of the first display panel 104 of FIG. 1 and/or the second display panel 204 of FIG. 2 by including the HPS 124 in and/or otherwise integrated with the display panel 104, 204 and adjusting the power state with hardware, software, and/or firmware of the display panel 104, 204 for an improved user experience and reduction(s) in power consumption and/or utilized computing resources.

Data flow diagrams and/or flowcharts representative of example hardware logic, machine readable instructions, hardware implemented state machines, and/or any combination thereof for implementing the first example human detection system 102 of FIG. 1, the second example human detection system 202 of FIG. 2, and/or the third human detection system 400 of FIG. 4 is/are shown in FIGS. 9-14. The machine readable instructions may be one or more executable programs or portion(s) of an executable program for execution by a computer processor and/or processor circuitry, such as the processor 1512 shown in the example processor platform 1500 discussed below in connection with FIG. 15, the example processor platform 1600 discussed below in connection with FIG. 16, and/or the example processor platform discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1512, the processor platform 1600, and/or the processor platform 1700, but the entire program and/or parts thereof could alternatively be executed by a device other than the processor 1512, the processor platform 1700, and/or the processor platform 1700, and/or embodied in firmware or dedicated hardware. Further, although the example program is described with reference to the data flow diagrams and/or the flowcharts illustrated in FIGS. 9-14, many other methods of implementing the first example human detection system 102 of FIG. 1, the second example human detection system 202 of FIG. 2, and/or the third human detection system 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), an SDK, an API, etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
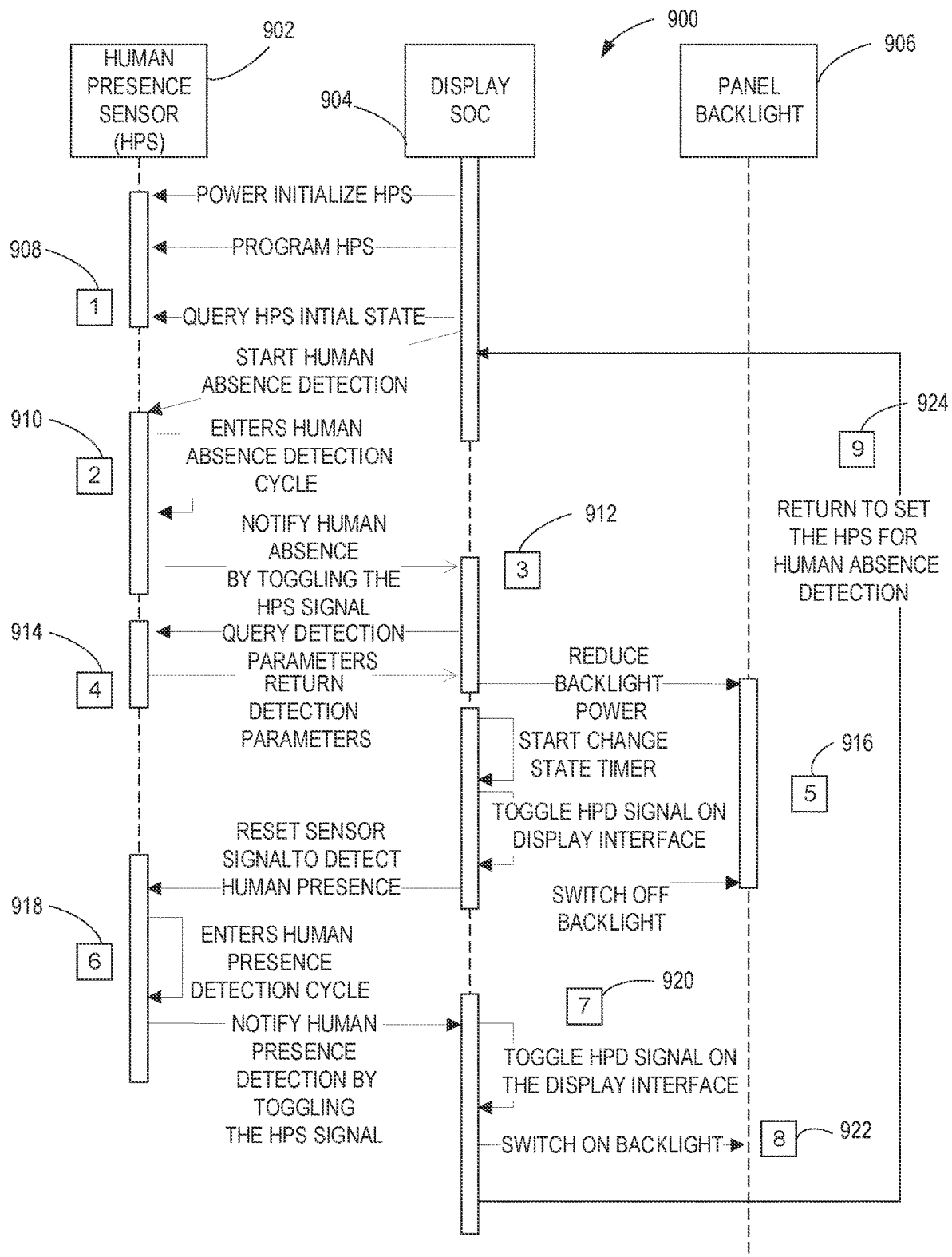
FIG. 9 is an example data flow diagram associated with the example human detection system of FIG. 1.

FIG. 9 is a first example data flow diagram 900 associated with the first example human detection system 102 of FIG. 1, and/or, more generally, the first example computing environment 100 of FIG. 1. The first data flow diagram 900 is representative of example hardware logic, machine readable instructions, hardware implemented state machines, and/or any combination thereof for implementing an example HPS 902, an example display SoC 904, and an example panel backlight 906. In some examples, the HPS 902 of FIG. 9 corresponds to the HPS 124 of FIGS. 1 and/or 2. In some examples, the display SoC 904 of FIG. 9 corresponds to the display SoC 126 of FIG. 1 and/or the SoC 490 of FIG. 4. In some examples, the panel backlight 906 corresponds to the panel backlight 144 of FIGS. 1 and/or 2.

During a first example operation 908 of the first data flow diagram 900, the display SoC 904 power initializes the HPS 902. For example, the sensor configurator 410 (FIG. 4) directs the display SoC 904 to deliver power to the HPS 902. During the first operation 908, the display SoC 904 programs the HPS 902. For example, the sensor configurator 410 programs the HPS 902 to configure one or more detection parameters of the HPS 902, such as a presence confidence, an attention level, an attention confidence, a threshold of detection, etc., and/or a combination thereof. During the first operation 908, the display SoC 904 queries the HPS 902 for an initial state of the HPS 902. For example, the sensor interface 420 (FIG. 4) queries the HPS 902 for a distance measurement of a present or instant object, such as the human 130 of FIG. 1, whether the human 130 is present or not present, etc., and/or a combination thereof. At or prior to the end of the first operation 908, the display panel 104, 204 of FIGS. 1 and/or 2 is powered and fully operational by presenting video data, video frames, etc., from the main SoC 108 of FIG. 1, to the human 130. In some examples, irrespective of the human 130 present or absent, the display SoC 904 makes a state as if the human is present. In such examples, this ensures that the main SoC 108 and the display SoC 904 are in the same state of human presence information.

During a second example operation 910 of the first data flow diagram 900, the display SoC 904 invokes the HPS 902 to start human absence detection. For example, the sensor interface 420 transmits a trigger command, a start command, etc., to the HPS 902 to begin detecting for absence of a user, such as the human 130. During the second operation 910, in response to starting human absence detection, the HPS 902 enters a human absence detection cycle.

During a third example operation 912 of the first data flow diagram 900, the HPS 902 detects an absence of a user, such as the human 130, and notifies human absence by asserting or generating a digital '1', and/or otherwise generating the HPS signal 132 of FIG. 1. For example, the alert generator 460 (FIG. 4) generates the HPS signal 132 to be indicative and/or otherwise representative of absence of the human 130. During the third operation 912, the HPS 902 transmits the HPS signal 132 to the display SoC 904 as the IRQ signal 134 of FIG. 1. For example, the sensor interface 420 obtains the HPS signal 132 and the human detector 430 (FIG. 4) determines that the human 130 is absent based on the HPS signal 132 being indicative of human absence.

During a fourth example operation 914 of the first data flow diagram 900, the display SoC 904 queries the HPS 902 for detection parameters, such as presence confidence, attention level, attention confidence, a threshold of detection, etc., and/or a combination thereof. During the fourth operation 914, in response to the query, the HPS 902 transmits the detection parameters to the display SoC 904. For example, the sensor interface 420 queries the HPS 902 for the detection parameters and receive the detection parameters from the HPS 902.

During a fifth example operation 916 of the first data flow diagram 900, the display SoC 904 reduces a backlight power, intensity, etc., of the panel backlight 906 from a first level (e.g., 100% of peak power, 95% of peak power, etc.) to a second level (e.g., 20% of peak power, 15% of peak power, etc.). During the fifth operation 916, the display SoC 904 starts and/or otherwise triggers a change state timer. For example, the human detector 430 (FIG. 4) starts the change state timer to determine whether a time period for that the human 130 is absent satisfies a threshold (e.g., an absence threshold, a change state time threshold, etc.).

During the fifth operation 916, in response to the change state timer elapsing, the display SoC 904 toggles the HPD signal, such as the HPD signal 140 of FIG. 1, on a display interface, such as an HDMI interface. For example, in response to the HPS signal 132 being asserted and the HPD signal being asserted, the alert generator 460 de-asserts the HDL signal 142, which, in some examples, is transmitted to the main SoC 108 of FIG. 1 via the display interface 110 of FIG. 1. In such examples, in response to receiving the HDL signal 142, the main SoC 108 ceases transmission of video data to the display SoC 904 for presentation on the first display panel 104 of FIG. 1. During the fifth operation 916, in response to the change state timer elapsing, the display SoC 904 instructs the panel backlight 906 to turn or switch off. In response to turning off the panel backlight 906, the first display panel 104 of FIG. 1 is turned off (e.g., fully or completely turned off) and the main SoC 108 has executed a power management policy and, thus, the main SoC 108 enters and/or otherwise transitions into an appropriate power state based on the power profile of the main SoC 108.

During a sixth example operation 918 of the first data flow diagram 900, the display SoC 904 transmits a reset sensor signal to the HPS 902 to detect human presence. For example, the sensor configurator 410 transmits a signal to the HPS 902 to reset the HPS 902 for detection of human presence instead of human absence. During the sixth operation 918, the HPS 902 enters a human presence detection cycle.

During a seventh example operation 920 of the first data flow diagram 900, the HPS 902 detects a presence of the human 130 and notifies the display SoC 904 of the human presence by toggling the HPS signal. For example, the alert generator 460 generates the HPS signal 132. In such examples, the sensor interface 420 obtains the HPS signal 132 from the HPS 902 as the IRQ signal 134 in response to the HPS 902 detecting the human 130. During the seventh operation 920, the display SoC 904 toggles the HPD signal on the display interface in response to the human presence alert. For example, in response to a de-assertion of the HPS signal 132 and an assertion of the HPD signal 140, the HDL 128 asserts the HDL signal 142 to be indicative of human presence.

During an eighth example operation 922 of the first data flow diagram 900, the display SoC 904 switches on the backlight in response to the toggling of the HPD signal. During a ninth example operation 924 of the first data flow diagram 900, the display SoC 904 sets the HPS 902 to detect for human absence.

Figure 10A:
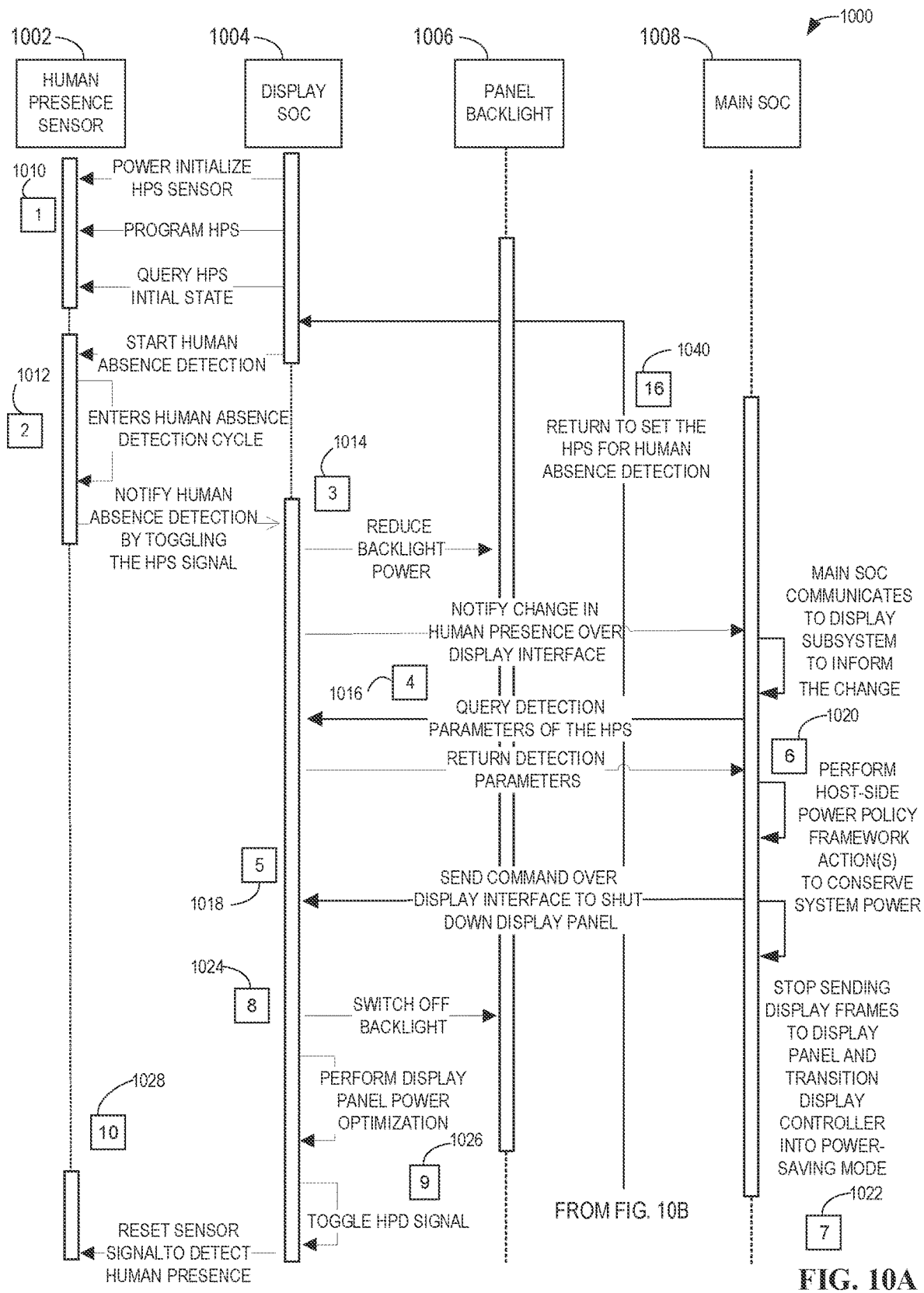
FIGS. 10A-10B depict an example data flow diagram associated with the example human detection system of FIG. 2.
Figure 10B:
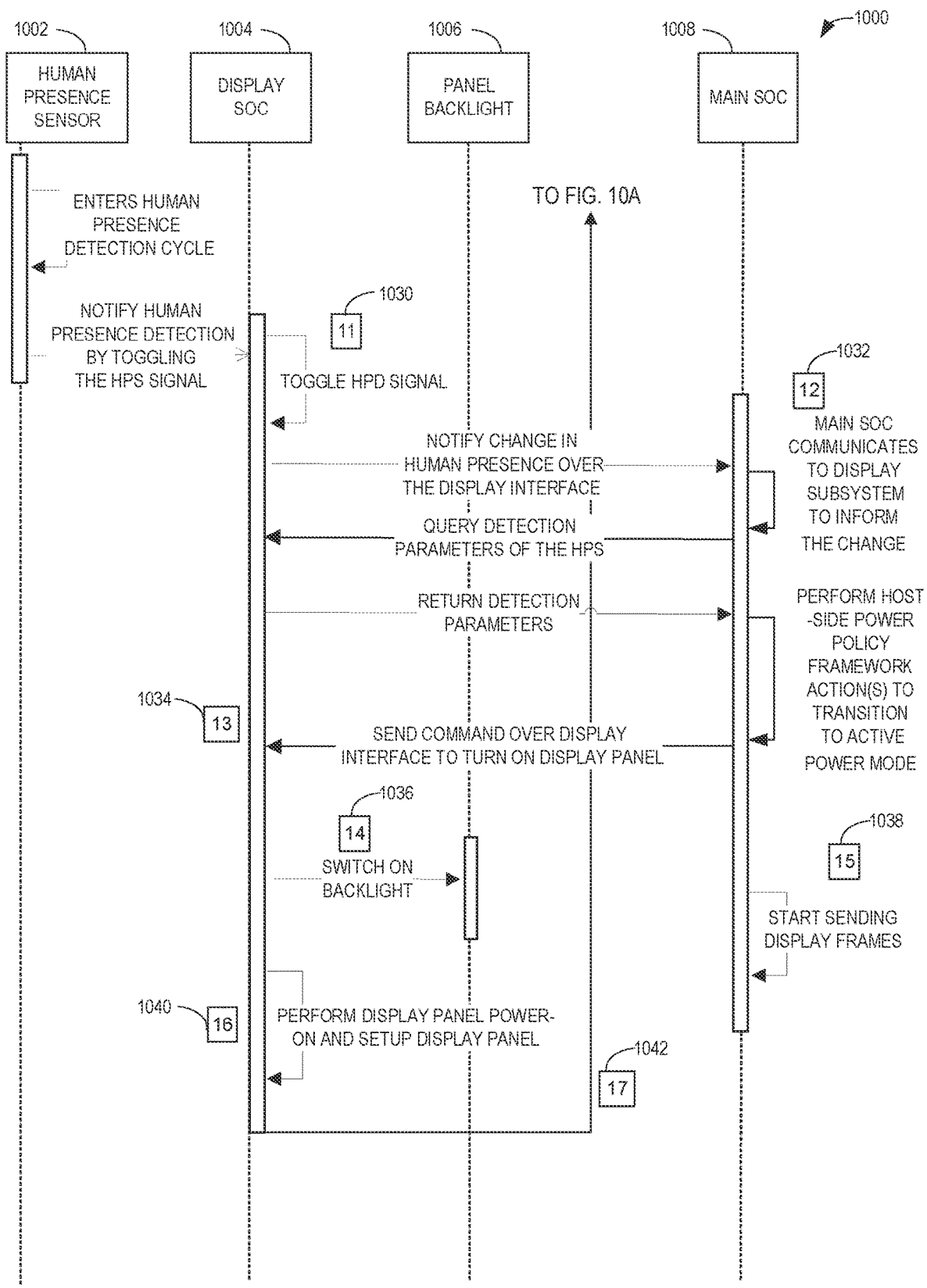

FIGS. 10A-10B depict a second example data flow diagram 1000 associated with the second example human detection system 202 of FIG. 2, and/or, more generally, the second example computing environment 200 of FIG. 2. The second data flow diagram 1000 is representative of example hardware logic, machine readable instructions, hardware implemented state machines, and/or any combination thereof for implementing an example HPS 1002, an example display SoC 1004, an example panel backlight 1006, and an example main SoC 1008. In some examples, the HPS 1002 of FIGS. 10A-10B corresponds to the HPS 124 of FIG. 2. In some examples, the display SoC 1004 of FIGS. 10A-10B corresponds to the display SoC 126 of FIGS. 1 and/or 2. In some examples, the panel backlight 1006 of FIGS. 10A-10B corresponds to the panel backlight 144 of FIG. 2. In some examples, the main SoC 1008 of FIGS. 10A-10B corresponds to the main SoC 108 of FIGS. 1 and/or 2.

During a first example operation 1010 of the second data flow diagram 1000, the display SoC 1004 power initializes the HPS 1002. For example, the sensor configurator 410 (FIG. 4) directs the display SoC 1004 to deliver power to the HPS 1002. During the first operation 1010, the display SoC 1004 programs the HPS 1002. For example, the sensor configurator 410 programs the HPS 1002 to configure one or more detection parameters of the HPS 1002, such as a presence confidence, an attention level, an attention confidence, a threshold of detection, etc., and/or a combination thereof.

During the first operation 1010, the display SoC 1004 queries the HPS 1002 for an initial state of the HPS 1002. For example, the sensor interface 420 (FIG. 4) queries the HPS 1002 for a distance measurement of a present or instant object, such as the human 130 of FIGS. 1 and/or 2, whether the human 130 is present or not present, etc., and/or a combination thereof. At or prior to the end of the first operation 1010, the second display panel 204 is powered and fully operational by presenting video data, video frames, etc., from the main SoC 1008 to the human 130. In some examples, irrespective of the human 130 being present or absent, the display SoC 904 makes a state as if the human 130 is present. In such examples, this is to ensure that the main SoC 108 and the display SoC 1108 are in the same state of human presence information.

During a second example operation 1012 of the second data flow diagram 1000, the display SoC 1004 invokes the HPS 1002 to start human absence detection. For example, the sensor interface 420 transmits a trigger command, a start command, etc., to the HPS 1002 to begin detecting for absence of a user, such as the human 130. During the second operation 1012, in response to starting human absence detection, the HPS 1002 enters a human absence detection cycle.

During a third example operation 1014 of the second data flow diagram 1000, the HPS 1002 detects an absence of a user, such as the human 130, and notifies human absence by asserting or generating a digital '1', and/or otherwise generating the HPS signal 132 of FIGS. 1 and/or 2. For example, the alert generator 460 (FIG. 4) generates the HPS signal 132 to be indicative and/or otherwise representative of absence of the human 130. During the third operation 1014, the HPS 1002 transmits the HPS signal 132, the IRQ signal 134, etc., to the display SoC 1004. For example, the sensor interface 420 obtains the HPS signal 132 and the human detector 430 (FIG. 4) determines that the human 130 is absent based on the HPS signal 132 being indicative of human absence.

During a fourth example operation 1016 of the second data flow diagram 1000, the main SoC 1008 queries the display SoC 1004 for detection parameters, such as presence confidence, attention level, attention confidence, a threshold of detection, etc., and/or a combination thereof. During the fourth operation 1016, in response to the query, the display SoC 1004 transmits the detection parameters to the main SoC 1008. For example, the sensor interface 420 queries the HPS 1002 for the detection parameters and receives the detection parameters from the HPS 1002. In such examples, the display SoC 1004 transmits the received detection parameters to the main SoC 1008.

During a fifth example operation 1018 of the second data flow diagram 1000, the display SoC 1004 reduces a backlight power, intensity, etc., of the panel backlight 1006 from a first level (e.g., 100% of peak power, 95% of peak power, etc.) to a second level (e.g., 20% of peak power, 15% of peak power, etc.). For example, the command generator 450 (FIG. 4) reduces a backlight power of the panel backlight 1006. During the fifth operation 1018, the display SoC 1004 notifies the main SoC 1008 over a display interface, such as the display interface 110 of FIGS. 1 and/or 2, that a change in human presence has been detected. For example, in response to a de-assertion of the HPS signal 132, the display SoC 1004 transmits an assertion of the HPD signal 140 of FIGS. 1 and/or 2 to the main SoC 1008 via the display interface 110.

During a sixth example operation 1020 of the second data flow diagram 1000, the main SoC 1008 communicates to a display subsystem, such as the VDC 120 of FIGS. 1 and/or 2, to inform the change in the human presence. For example, the human detector 430 (FIG. 4) informs the VDC 120 of the change in the human presence. During the sixth operation 1020, the main SoC 1008 queries the display SoC 1004 for detection parameters of the HPS 1002 over an AUX channel of the display interface 110 of FIG. 2. During the sixth operation 1020, in response to the query, the display SoC 1004 returns the detection parameters to the display SoC 1004 over the AUX channel of the display interface 110.

During the sixth operation 1020, the main SoC 1008 performs host-side power policy framework action(s) to conserve system power. For example, the power controller 118 of FIG. 2 executes one or more power policy actions to conserve power of the main SoC 1008, the display SoC 1004, and/or, more generally, the second computing system 206 of FIG. 2. In such examples, one or more power policy actions includes turning off a turbo performance option, reducing wireless fidelity (Wi-Fi) power (e.g., power delivered to Wi-Fi antenna (e) or radio(s)), and/or any other parameter, setting, etc., that affects power consumption and/or system performance. In some such examples, the main SoC 1008 executes the system wide power policy framework and enable systems that can put into a lower power mode, change a priority of tasks (e.g., computing tasks) that are running, stop or trigger the pause of and/or presentation of audio and/or video data, transition the second computing system 206 into a power state (e.g., an Intel® SOix state), etc.

During the sixth operation 1020, the main SoC 1008 sends a command over the display interface to shut down the display panel. For example, the VDC 120 of FIG. 2 generates a command and transmits the command to the display SoC 1004 via the display interface 110 to shut down and/or otherwise turn off the second display panel 204.

During a seventh example operation 1022 of the second data flow diagram 1000, the main SoC 1008 stops sending display frames to the display panel and transitions display controller into a power-saving mode. For example, the VDC 120 stops to cease transmitting display frames, video frames, etc., to the first display panel 104. In such examples, the power controller 118 instructs the VDC 120 & main SOC 108 and its other component to move to a power-saving mode based on the host side power policy framework.

During an eighth example operation 1024 of the second data flow diagram 1000, the display SoC 1004 switches off the backlight of the panel backlight 1006. During the eighth operation 1024, the display SoC 1004 performs display panel power optimization. For example, the display SoC 126 of FIG. 2 shuts down one or more computing processes, threads, etc., to transition the second display panel 204 into a power-saving mode.

During a ninth example operation 1026 of the second data flow diagram 1000, the display SoC 1004 toggles the HPD signal. For example, the alert generator 460 generates the HPD signal 140 to be indicative of the second display panel 204 not being powered and/or otherwise operating in the power-saving mode.

During a tenth example operation 1028 of the second data flow diagram 1000, the display SoC 1004 transmits a reset sensor signal to the HPS 1002 to detect human presence. For example, the sensor configurator 410 transmits a signal to the HPS 1002 to reset the HPS 1002 for detection of human presence instead of human absence. During the tenth operation 1028, the HPS 1002 enters a human presence detection cycle.

During an eleventh example operation 1030 of the second data flow diagram 1000, the HPS 1002 detects a presence of the human 130 and notifies the display SoC 1004 of the human presence by de-asserting the HPS signal. For example, the alert generator 460 generates the HPS signal 132 to be indicative of the human 130 being present proximate to the second display panel 204 and/or otherwise within range of the HPS 1002. In such examples, the sensor interface 420 obtains the HPS signal 132, the IRQ signal 134, etc., from the HPS 1002 in response to the HPS 1002 detecting the human 130. During the eleventh operation 1030, the display SoC 1004 toggles the HPD signal 140 of FIG. 2 on the display interface in response to the human presence alert.

During a twelfth example operation 1032 of the second data flow diagram 1000, the main SoC 1008 communicates to the display subsystem, such as the VDC 120 of FIGS. 1 and/or 2, to inform the change in the human presence. For example, the human detector 430 informs the VDC 120 of the change in the human presence over the AUX channel of the display interface 110. During the twelfth operation 1032, the main SoC 1008 queries the display SoC 1004 for detection parameters of the HPS 1002. During the twelfth operation 1032, in response to the query, the display SoC 1004 returns the detection parameters to the display SoC 1004 via the display interface, such as the display interface 110 of FIGS. 1 and/or 2.

During the twelfth operation 1032, the main SoC 1008 performs host-side power policy framework action(s) to transition from a power-saving mode to an active power mode. For example, the power controller 118 executes one or more power policy actions to enable an active power mode of the main SoC 1008, the display SoC 1004, and/or, more generally, the second computing system 206 of FIG. 2. In such examples, the one or more power policy actions includes turning on a turbo performance option, increasing wireless fidelity (Wi-Fi) power (e.g., power delivered to Wi-Fi antenna (e) or radio(s)), and/or any other parameter, setting, etc., that affects power consumption and/or system performance.

During a thirteen example operation 1034 of the second data flow diagram 1000, the display SoC 1004 sends a command and panel configuration information over the display interface to restart the display panel. For example, the VDC 120 of FIG. 2 generates a command and transmits the command to the display SoC 1004 via the display interface 110 to restart and/or otherwise turn on the second display panel 204. In such examples, the display SoC 1004 performs routine steps to return the display panel configuration to the main SoC 1008. During a fourteenth example operation 1036, the display SoC 1004 switches on the backlight of the panel backlight 1006.

During a fifteenth example operation 1038 of the second data flow diagram 1000, the main SoC 1008 starts sending display frames to the display SoC 1004. For example, the VDC 120 transmits display frames to the display SoC 1004 for presentation on the second display panel 204.

During a sixteenth example operation 1040 of the second data flow diagram 1000, the display SoC 1004 performs a display panel power-on and setups the display panel. For example, the display SoC 1004 to perform a display panel power-on operation and setup the second display panel 204 for presentation of the video frames from the main SoC 1008. During a seventeenth example operation 1042 of the second data flow diagram 1000, the display SoC 1004 sets the HPS 1002 to detect for human absence.

Figure 11A:
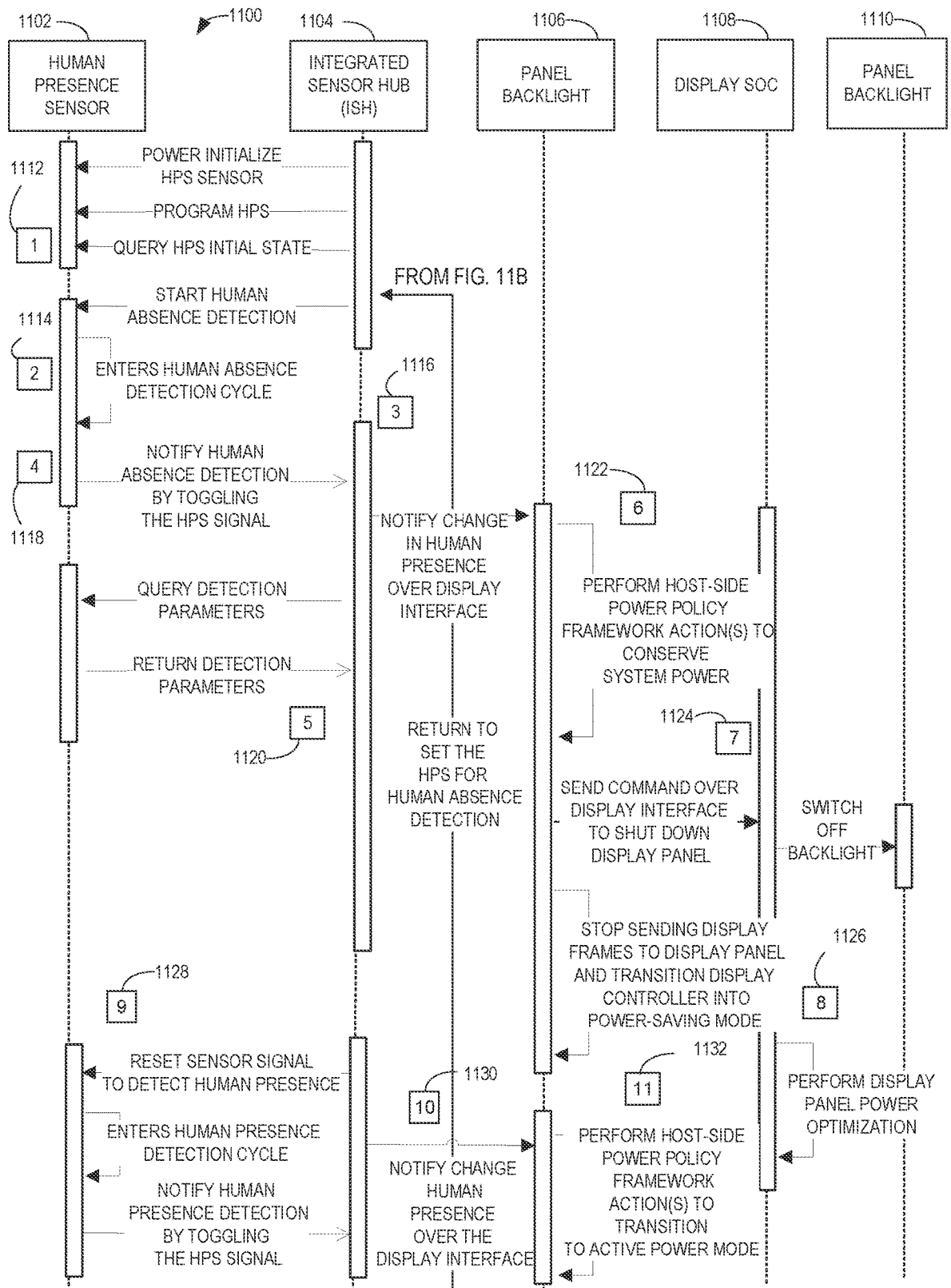
FIGS. 11A-11B depict an example data flow diagram associated with the host hardware and the display panel of FIG. 3.
Figure 11B:
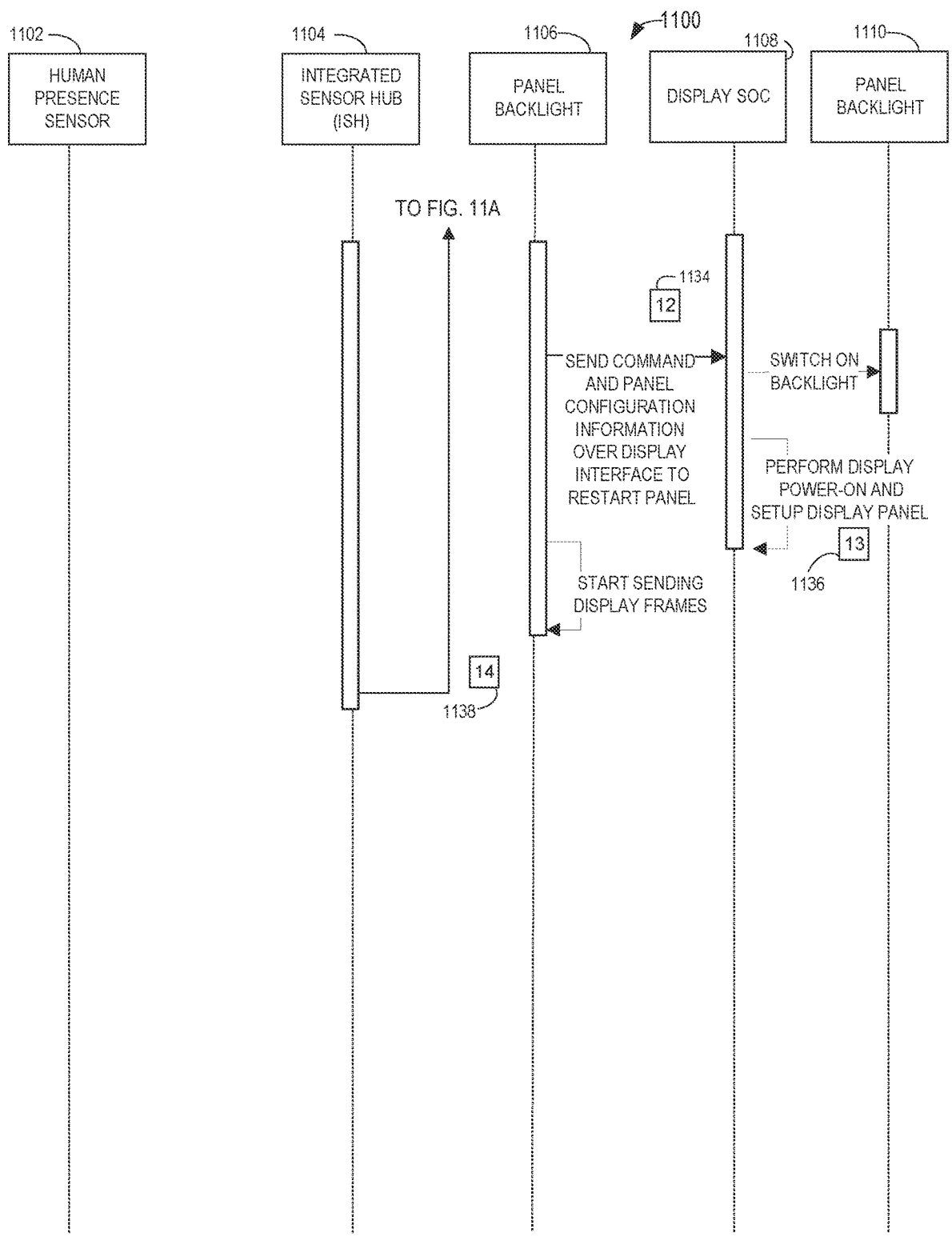

FIGS. 11A-11B depict a third example data flow diagram 1100 associated with the SoC 304 of FIG. 3, and/or, more generally, the third computing system 300 of FIG. 3. The third data flow diagram 1100 is representative of example hardware logic, machine readable instructions, hardware implemented state machines, and/or any combination thereof for implementing an HPS 1102, an ISH 1104, a main SoC 1106, a display SoC 1108, a panel backlight 1110. In some examples, the HPS 1102 of FIGS. 11A-11B corresponds to the HPS 306 of FIG. 3. In some examples, the ISH 1104 of FIGS. 11A-11B corresponds to the ISH 320 of FIG. 3. In some examples, the main SoC 1106 of FIGS. 11A-11B corresponds to the SoC 304 of FIG. 3. In some examples, the display SoC 1108 of FIGS. 11A-11B corresponds to an SoC included in the third display panel 302 of FIG. 3. In some examples, the panel backlight 1110 of FIGS. 11A-11B correspond to a panel backlight included in the third display panel 302 of FIG. 3, such as the panel backlight 144 of FIGS. 1 and/or 2.

During a first example operation 1112 of the third data flow diagram 1100, the ISH 1104 power initializes the HPS 1102, programs the HPS 1102, and queries the HPS 1102 for an initial state of the HPS 1102. At or prior to the end of the first operation 1112, the third display panel 302 is powered and fully operational by presenting video data, video frames, etc., from the main SoC 1106 to the human 130.

During a second example operation 1114 of the third data flow diagram 1100, the ISH 1104 invokes the HPS 1102 to start human absence detection to cause the HPS 1102 to enter a human absence detection cycle. During a third example operation 1116 of the third data flow diagram 1100, the HPS 1102 detects an absence of a user, such as the human 130, and notifies human absence by toggling and/or otherwise generating the HPS signal 132 of FIGS. 1 and/or 2 via the HPS interface 310 of FIG. 3.

During a fourth example operation 1118 of the third data flow diagram 1100, the ISH 1104 queries the HPS 1102 for detection parameters, and, in response to the query, the HPS 1102 transmits the detection parameters to the ISH 1104. During a fifth example operation 1120 of the third data flow diagram 1100, the ISH 1104 notifies the main SoC 1106 over a bus, such as the bus 322 of FIG. 3, that a change in human presence has been detected.

During a sixth example operation 1122 of the third data flow diagram 1100, the main SoC 1106 performs host-side power policy framework action(s) to conserve system power. During a seventh operation 1124 of the third data flow diagram 1100, the main SoC 1106 sends a command over a display interface, such as the display interface 308 of FIG. 3, to shut down the third display panel 302. During the seventh operation 1124, in response to the command, the display SoC 1108 switches off the panel backlight 1110.

During an eighth example operation 1126 of the third data flow diagram 1100, the main SoC 1106 stops sending display frames to the third display panel 302 and transitions a display controller, such as the VDC 120 of FIG. 3, into a power-saving mode. During the eighth operation 1126, the display SoC 1108 performs a display panel power optimization.

During a ninth example operation 1128 of the third data flow diagram 1100, the ISH 1104 resets the sensor signal of the HPS 1102 to detect for human presence. During the ninth operation 1128, in response to the reset, the HPS 1102 enters a human presence detection cycle.

During a tenth example operation 1130 of the third data flow diagram 1100, the HPS 1102 detects the human 130, and transmits a notification of a detection of human presence to the ISH 1104 by toggling the HPS signal of the HPS 1102. During the tenth operation 1130, the ISH 1104 notifies the main SoC 1106 of the change in human presence over a bus, such as the bus 322 of FIG. 3.

During an eleventh example operation 1132 of the third data flow diagram 1100, the main SoC 1106 performs host-side power policy framework action(s) to transition the main SoC 1106 to an active power mode. During a twelfth example operation 1134 of the third data flow diagram 1100, the main SoC 1106 sends a command and panel configuration information to the display SoC 1108 over a display interface, such as the display interface 308 of FIG. 3. During the twelfth operation 1134, the main SoC 1106 starts sending display frames to the third display panel 302.

During a thirteenth example operation 1136 of the third data flow diagram 1100, the display SoC 1108 switches on the panel backlight 1110 and performs a display power turn-on and setup of the third display panel 302. During a fourteenth example operation 1138 of the third data flow diagram 1100, the ISH 1104 returns to set the HPS 1102 for human absence detection.

Advantageously, in some examples, the first human detection system 102 of FIG. 1, the second human detection system 202 of FIG. 2, and/or the third human detection system 400 of FIG. 4 adjusts a power state of a display device, such as the first display panel 104 of FIG. 1 and/or the second display panel 204 of FIG. 2, without interfacing with an ISH, such as the ISH 320 of FIG. 3. Advantageously, the first human detection system 102 of FIG. 1, the second human detection system 202 of FIG. 2, and/or the third human detection system 400 of FIG. 4 are improvement(s) of the third computing system 300 of FIG. 3 by effectuating display power management with example hardware, software, and/or firmware included in and/or executing on the display panel and, in some examples, without interfacing with a host OS, a main SoC interface, etc.

Figure 12:
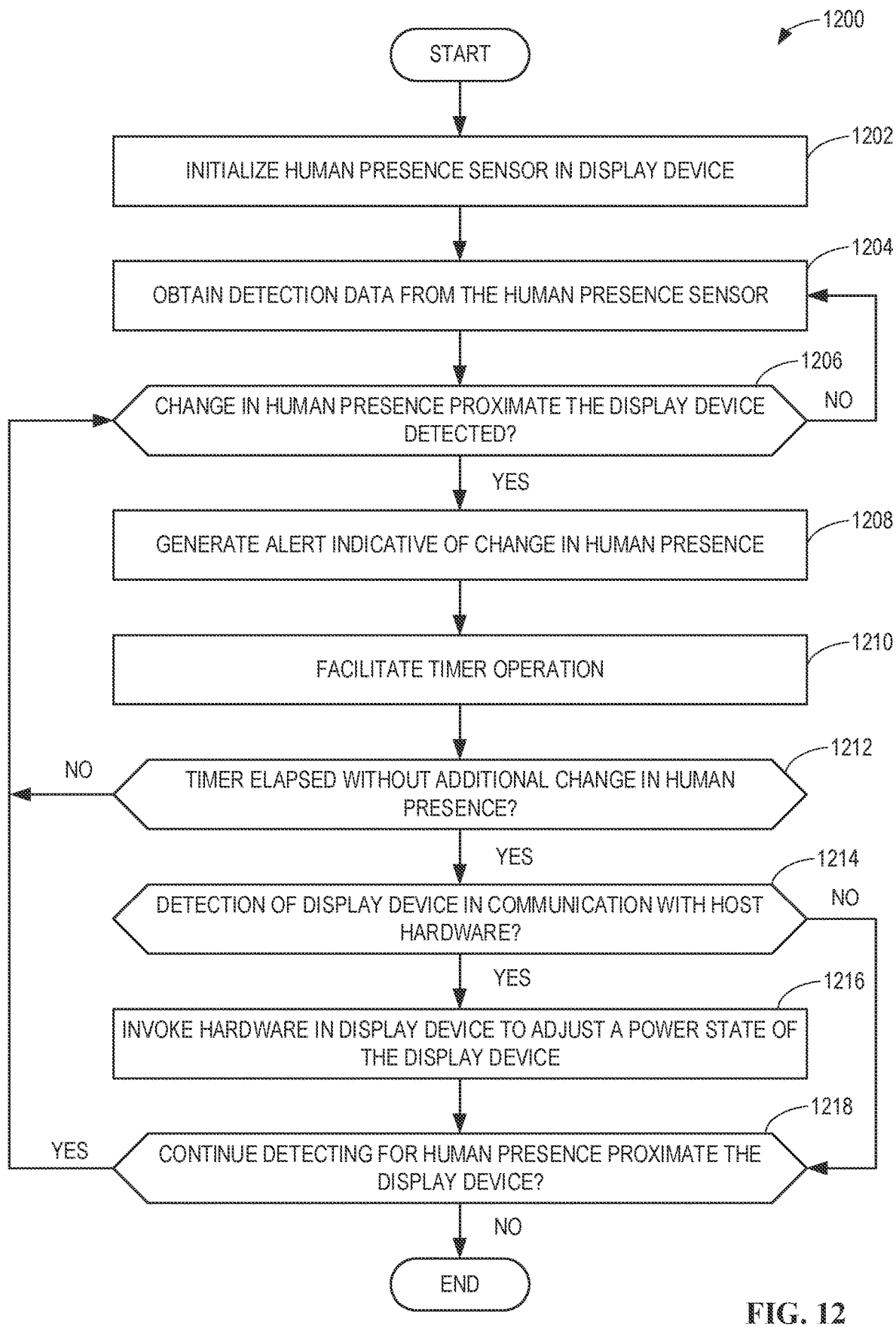
FIG. 12 is a flowchart representative of example machine readable instructions that may be executed to implement the example human detection controller of FIG. 4, and/or, more generally, the example human detection system of FIG. 4, to invoke example hardware in the example display device of FIG. 1 to adjust a power state of the display device.

FIG. 12 is a flowchart representative of example machine readable instructions 1200 that may be executed to implement the first human detection system 102 of FIG. 1, the human detection controller 405 of FIG. 4, and/or, more generally, the third human detection system 400 of FIG. 4, to invoke hardware in the first example display panel 104 of FIG. 1 to adjust a power state of the first display panel 104. The machine readable instructions 1200 of FIG. 12 begin at block 1202, at which the third human detection system 400 initializes a human presence sensor in a display device. For example, the sensor configurator 410 (FIG. 4) power initializes the HPS 124 of FIG. 1. In such examples, the sensor configurator 410 programs the HPS 124 using one or more detection parameters.

At block 1204, the third human detection system 400 obtains detection data from the human presence sensor. For example, the sensor interface 420 (FIG. 4) obtains at least one of the HPS signal 132 or the HPS data 138 from the HPS 124. In such examples, the sensor interface 420 obtains an initial or current state of the HPS 124, such as whether the human 130 is detected, a distance of the human 130 from the first display panel 104, etc.

At block 1206, the third human detection system 400 determines whether a change in human presence proximate the display device is detected. For example, the HPS 124 determines whether a change in the presence of the human 130 is detected. In such examples, the HPS 124 determines that the change in the presence of the human 130 is detected when the human 130 steps away from the first display panel 104 and is no longer proximate the first display panel 104, returns to the first display panel 104 within a range (e.g., a detection range) of the HPS 124 and is proximate the first display panel 104, etc.

If, at block 1206, the third human detection system 400 determines that a change in human presence proximate the display device is not detected, control returns to block 1204 to obtain detection data from the human presence sensor. If, at block 1206, the third human detection system 400 determines that a change in human presence proximate the display device is detected, then, at block 1208, the third human detection system 400 generates an alert indicative of a change in human presence. For example, the HPS 124 generates the HPS signal 132 based on whether the human 130 is present. In such examples, the HPS 124 de-asserts the HPS signal 132 in response to detecting the human 130 and assert the HPS signal 132 in response to not detecting the human 130. The human detector 430 (FIG. 4) determines that the HPS 124 detects the human 130 based on the HPS signal 132. In such examples, the human detector 430 determines that a de-assertion of the HPS signal 132 is indicative of the HPS 124 detecting the human 130 and an assertion of the HPS signal 132 is indicative of the HPS 124 not detecting the human 130.

At block 1210, the third human detection system 400 facilitates timer operation. For example, in response to receiving the HPS signal 132 from the HPS 124, the human detector 430 triggers a power state change timer to begin in response to the alert.

At block 1212, the third human detection system 400 determines whether the timer has elapsed without an additional change in human presence. For example, the human detector 430 determines that the power state change timer has elapsed without an additional change in the human presence, such as the HPS 124 first determining an absence of the human 130 and then determine a presence of the human 130 before the power state change timer has elapsed.

If, at block 1212, the third human detection system 400 determines that the timer has not elapsed and/or an additional change in human presence has been detected, control returns to block 1206 to determine whether a change in human presence proximate the display device is detected. If, at block 1212, the third human detection system 400 determines that the timer has elapsed without an additional change in human presence being detected, then, at block 1214, the third human detection system 400 determines whether communication of the display device with host hardware has been detected. For example, the display SoC 126 determines that the first display panel 104 is in communication with the main SoC 108 of FIG. 1 via the display interface 110 of FIG. 1. In such examples, the alert generator 460 generates the HPD signal 140 of FIG. 1 based on the detection.

If, at block 1214, the third human detection system 400 determines that the display device is not in communication with the host hardware, control proceeds to block 1218 to determine whether to continue detecting for human presence proximate the display device. If, at block 1214, the third human detection system 400 determines that the display device is in communication with the host hardware, then, at block 1216, the third human detection system 400 invokes hardware in the display device to adjust a power state of the display device. For example, the display SoC 126 changes a brightness of the panel backlight 144, turns on or off the first display panel 104, generate the HDL signal 142 to be indicative of the change in human presence, etc. In such examples, the alert generator 460 asserts the HDL signal 142 in response to a de-assertion of the HPS signal 132 and an assertion of the HPD signal 140. In some examples, the HPS 124 generates the IRQ signal 134 to be transmitted to the display SoC 126. In some such examples, the alert generator 460 de-asserts the HDL signal 142 in response to an assertion of the HPS signal 132 and an assertion of the HPD signal 140. In some examples, in response to receiving the HDL signal 142, the VDC 120 of FIG. 1 determines to cease or begin transmitting video frames to the first display panel 104.

At block 1218, the third human detection system 400 determines whether to continue detecting for human presence proximate the display device. For example, the sensor interface 420 determines whether to continue monitoring the HPS 124 for a change in human presence. If, at block 1218, the third human detection system 400 determines to continue detecting for human presence proximate the display device, control returns to block 1206 to determine whether a change in human presence proximate the display device has been detected. If, at block 1218, the third human detection system 400 determines not to continue detecting for human presence proximate the display device, the machine readable instructions 1200 of FIG. 12 conclude.

Figure 13:
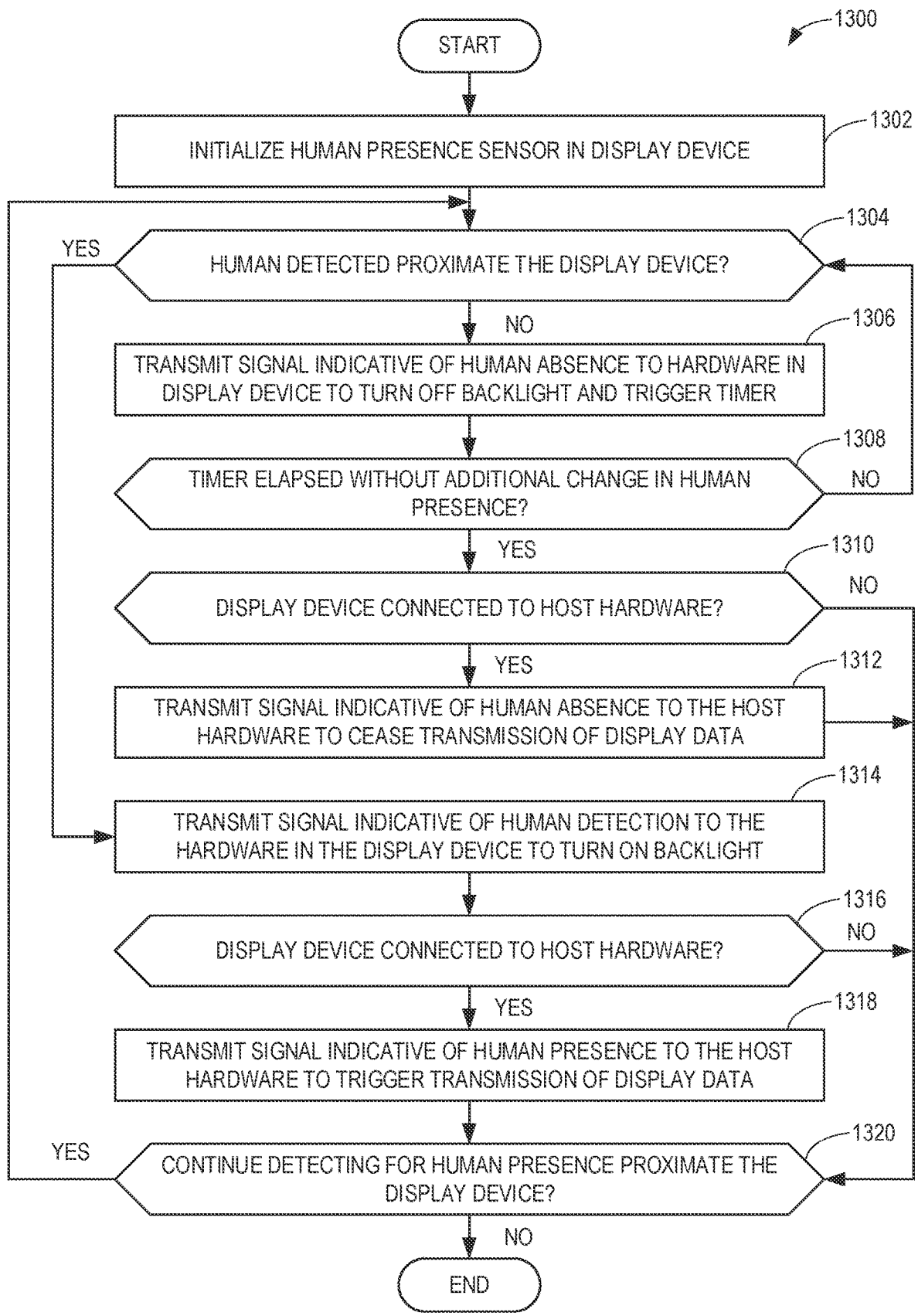
FIG. 13 is a flowchart representative of example machine readable instructions that may be executed to implement the example human detection controller of FIG. 4, and/or, more generally, the example human detection system of FIG. 4, to invoke example hardware in the example display device of FIG. 1 and/or the host hardware of FIGS. 1 and/or 2 to adjust a power state of the display device.

FIG. 13 is a flowchart representative of example machine readable instructions 1300 that may be executed to implement the human detection controller of 405 of FIG. 4, and/or, more generally, the third human detection system 400 of FIG. 4, to invoke hardware in the first display panel 104 of FIG. 1 and/or the main SoC 108 of FIG. 1 to adjust a power state of the first display panel 104. The machine readable instructions 1300 of FIG. 13 begin at block 1302, at which the third human detection system 400 initializes a human presence sensor in a display device. For example, the sensor configurator 410 (FIG. 4) power initializes the HPS 124 of FIGS. 1 and/or 2. In such examples, the sensor configurator 410 programs the HPS 124 using one or more detection parameters.

At block 1304, the third human detection system 400 determines whether a human is detected proximate the display device. For example, the HPS 124 determines whether the human 130 is within a detection range of the HPS 124, and/or, more generally, the first display panel 104.

If, at block 1304, the third human detection system 400 determines that the human is not detected proximate the display device, then, at block 1306, the third human detection system 400 transmits a signal indicative of human absence to hardware in the display device to turn off a backlight and trigger a timer. For example, the HPS 124 transmits the HPS signal 132 to the display SoC 126 as the IRQ signal 134. In such examples, the sensor interface 420 (FIG. 4) receives the IRQ signal 134 and the human detector 430 (FIG. 4) determines whether the human 130 is absent based on the IRQ signal 134. The human detector 430 triggers a power state change timer based on the IRQ signal 134. In some such examples, in response to the human detector 430 determining that the human 130 is not present, the command generator 450 (FIG. 4) directs the first display panel 104 to turn off the backlight of the first display panel 104.

At block 1308, the third human detection system 400 determines whether the timer has elapsed without an additional change in human presence. For example, the human detector 430 determines that the power state change timer has elapsed without an additional change in the human presence, such as the HPS 124 first determining an absence of the human 130 and then determining a presence of the human 130 before the power state change timer has elapsed.

If, at block 1308, the third human detection system 400 determines that the timer has not elapsed and/or an additional change in human presence has been detected, control returns to block 1304 to determine whether a change in human presence proximate the display device is detected. If, at block 1308, the third human detection system 400 determines that the timer has elapsed without an additional change in human presence being detected, then, at block 1310, the third human detection system 400 determines whether the display device is connected to host hardware.

For example, the human detector 430 determines that the first display panel 104 is in communication with the main SoC 108 of FIG. 1 via the display interface 110 of FIG. 1. In such examples, the alert generator 460 generates the HPD signal 140 of FIG. 1 based on the detection.

If, at block 1310, the third human detection system 400 determines that the display device is not connected to host hardware, control proceeds to block 1320 to determine whether to continue detecting for human presence proximate the display device. If, at block 1310, the third human detection system 400 determines that the display device is connected to host hardware, then, at block 1312, the third human detection system 400 transmits a signal indicative of human absence to the host hardware to cease transmission of display data. For example, the alert generator 460 transmits the HDL signal 142 to the main SoC 108 to invoke the VDC 120 to stop transmitting video frames to the first display panel 104. In response to transmitting the signal indicative of human absence to the host hardware to cease transmission of display data at block 1312, control proceeds to block 1320 to determine whether to continue detecting for human presence proximate the display device.

If, at block 1304, the third human detection system 400 determines that the human is detected proximate the display device, control proceeds to block 1314 to transmit a signal indicative of human detection to hardware in the display device to turn on a backlight. For example, the command generator 450 instructs the display SoC 126 to turn on the backlight of the first display panel 104.

At block 1316, the third human detection system 400 determines whether the display device is connected to host hardware. For example, the human detector 430 determines that the first display panel 104 is in communication with the main SoC 108 of FIG. 1 via the display interface 110 of FIG. 1. In such examples, the alert generator 460 generates the HPD signal 140 of FIG. 1 based on the detection.

If, at block 1316, the third human detection system 400 determines that the display device is not connected to host hardware, control proceeds to block 1320 to determine whether to continue detecting for human presence proximate the display device. If, at block 1316, the third human detection system 400 determines that the display device is connected to host hardware, then, at block 1318, the third human detection system 400 transmits a signal indicative of human presence to the host hardware to trigger transmission of display data. For example, the alert generator 460 transmits the HDL signal 142 to the main SoC 108 to invoke the VDC 120 to begin transmitting video frames to the first display panel 104.

At block 1320, the third human detection system 400 determines whether to continue detecting for human presence proximate the display device. For example, the sensor interface 420 determines whether to continue monitoring the HPS 124 for a change in human presence. If, at block 1320, the third human detection system 400 determines to continue detecting for human presence proximate the display device, control returns to block 1304 to determine whether a human is detected proximate the display device. If, at block 1320, the third human detection system 400 determines not to continue detecting for human presence proximate the display device, the machine readable instructions 1300 of FIG. 13 conclude.

Figure 14:
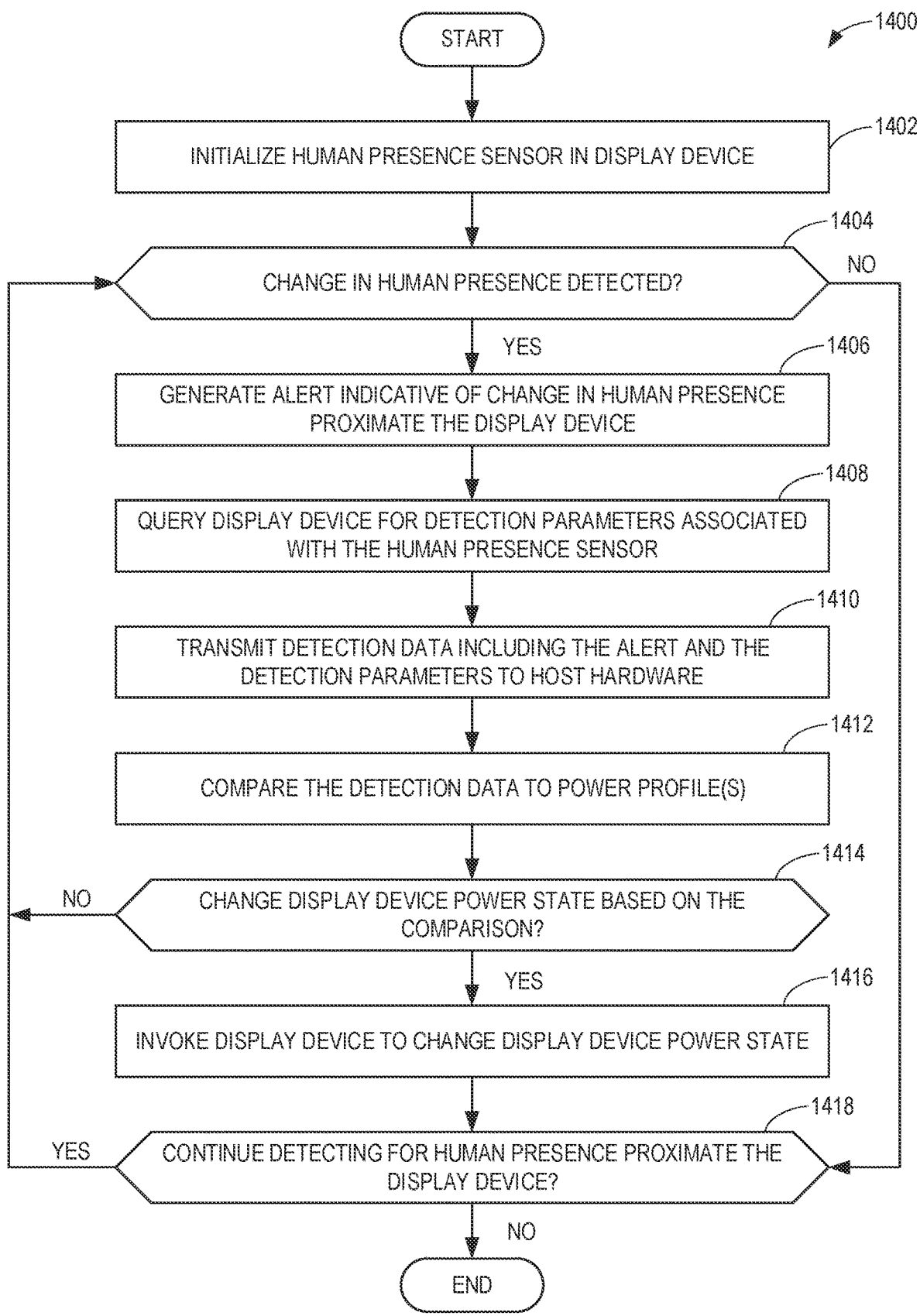
FIG. 14 is a flowchart representative of example machine readable instructions that may be executed to implement the example human detection controller of FIG. 4, and/or, more generally, the example human detection system of FIG. 4, to invoke host hardware to adjust a power state of the example display device of FIG. 2.

FIG. 14 is a flowchart representative of example machine readable instructions 1400 that may be executed to implement the human detection controller 405 of FIG. 4, and/or, more generally, the third human detection system 400 of FIG. 4, to invoke the main SoC 108 of FIGS. 1 and/or 2 to adjust a power state of the second display panel 204 of FIG. 2. The machine readable instructions 1400 of FIG. 14 begin at block 1402, at which the third human detection system 400 initializes a human presence sensor in a display device. For example, the sensor configurator 410 (FIG. 4) power initializes the HPS 124 of FIGS. 1 and/or 2. In such examples, the sensor configurator 410 configures the HPS 124 using one or more detection parameters.

At block 1404, the third human detection system 400 determines whether a change in human presence is detected. For example, the HPS 124 generates the HPS signal 132 based on determining whether the human 130 of FIGS. 1 and/or 2 is within a detection range of the HPS 124, and/or, more generally, the second display panel 204. In such examples, the human detector 430 (FIG. 4) determines that the human 130 is within the detection range based on the HPS signal 132.

If, at block 1404, the third human detection system 400 determines that a change in human presence is not detected, control proceeds to block 1418 to determine whether to continue detecting for human presence proximate the display device. If, at block 1404, the third human detection system 400 determines that a change in human presence is detected, then, at block 1406, the third human detection system 400 generates an alert indicative of a change in human presence proximate the display device. For example, the alert generator 460 (FIG. 4) generates the HPD signal 140 based on the detection of the human 130. In such examples, the alert generator 460 asserts the HPD signal 140 in response to detecting the human 130 and de-asserts the HPD signal 140 in response to not detecting the human 130.

At block 1408, the third human detection system 400 queries the display device for detection parameters associated with the human presence sensor. For example, the main SoC 108 queries the display SoC 126 for one or more detection parameters associated with the HPS 124. In such examples, the sensor configurator 410 returns the one or more detection parameters to the main SoC 108.

At block 1410, the third human detection system 400 transmits detection data including the alert and the detection parameters to host hardware. For example, the alert generator 460 transmits detection data including at least one of the display data 127 or the HPD signal 140 to the main SoC 108 via the display interface 110.

At block 1412, the third human detection system 400 compares the detection data to power profile(s). For example, the power profiler 440 (FIG. 4) compares the HPD signal 140, the one or more detection parameters, etc., and/or a combination thereof, to the power profile(s) 474 (FIG. 4). In other examples, the main SoC 108 compares the HPD signal 140, the one or more detection parameters, etc., and/or a combination thereof, to the power profile(s) 474 (FIG. 4).

At block 1414, the third human detection system 400 determines whether to change a display device power state based on the comparison. For example, the power profiler 440 determines to reduce a brightness, turn off the backlight, etc., of the second display panel 204 based on the comparison. In other examples, the power profiler 440 determines to increase a brightness, turn on the backlight, etc., of the second display panel 204 based on the comparison. In yet other examples, the main SoC 108 determines to change the display device power state based on the comparison.

If, at block 1414, the third human detection system 400 determines not to change the display device power state based on the comparison, control returns to block 1404 to determine whether a change in human presence has been detected. If, at block 1414, the third human detection system 400 determines to change the display device power state based on the comparison, then, at block 1416, the third human detection system 400 invokes the display device to change the display device power state. For example, the command generator 450 instructs the second display panel 204 to change a display device power state. In other examples, the main SoC 108 instructs the second display panel 204 to change the display device power state.

At block 1418, the third human detection system 400 determines whether to continue detecting for human presence proximate the display device. For example, the sensor interface 420 determines whether to continue monitoring the HPS 124 for a change in human presence. If, at block 1418, the third human detection system 400 determines to continue detecting for human presence proximate the display device, control returns to block 1404 to determine whether a change in human presence proximate the display device has been detected. If, at block 1418, the third human detection system 400 determines not to continue detecting for human presence proximate the display device, the machine readable instructions 1400 of FIG. 14 conclude.

Figure 15:
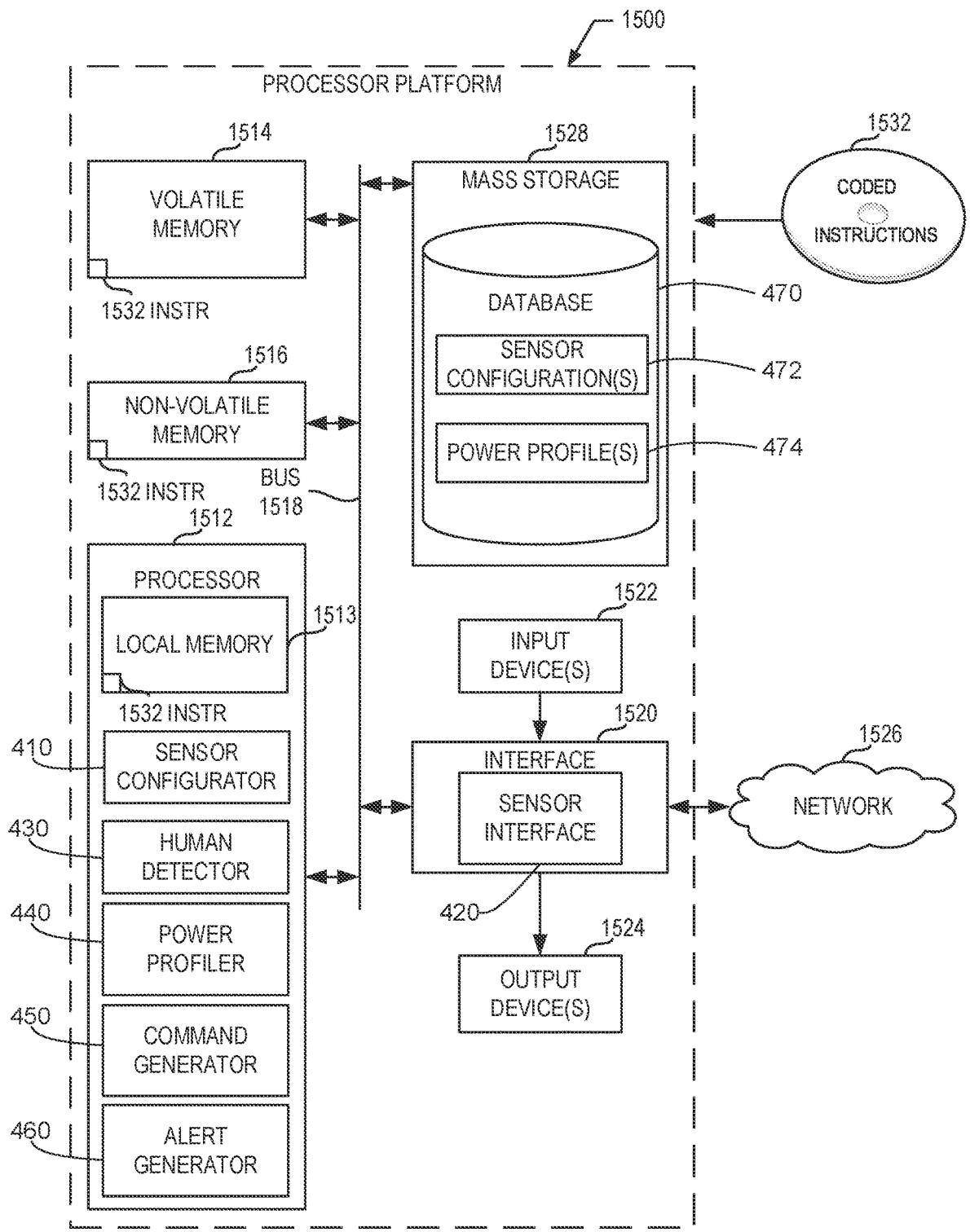
FIG. 15 is a block diagram of an example processing platform structured to execute the example machine readable instructions of FIGS. 12-14 to implement the example human detection controller of FIG. 4, and/or, more generally, the third example human detection system of FIG. 4.

FIG. 15 is a block diagram of an example processor platform 1500 structured to execute the instructions of FIGS. 9-14 to implement the example human detection controller 405 of FIG. 4. The processor platform 1500 can be, for example, a display panel, a personal computer, a workstation, or any other type of computing device. In some examples, the processor platform 1500 implements the first display panel 104 of FIG. 1 and/or portion(s) thereof. In some examples, the processor platform 1500 implements the second display panel 204 of FIG. 2 and/or portion(s) thereof.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the example sensor configurator 410, the example human detector 430, the example power profiler 440, the example command generator 450, and the example alert generator 460 of FIG. 4.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, a PCI express interface, an I2C interface, and/or a SPI or other serial interface. In this example, the interface circuit 1520 implements the example sensor interface 420 of FIG. 4.

In the illustrated example, one or more input devices 1522 are connected to the interface circuit 1520. The input device (s) 1522 permit(s) a user to enter data and/or commands into the processor 1512. The input device(s) 1522 can be implemented by, for example, an HPS, an audio sensor, a microphone, a camera (still or video), a keyboard, a button, a mouse, a touchscreen, a track-pad, a trackball, isopoint, and/or a voice recognition system.

One or more output devices 1524 are also connected to the interface circuit 1520 of the illustrated example. The output devices 1524 can be implemented, for example, by display devices (e.g., an LED, an OLED, an LCD, a CRT display, an IPS display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives. In this example, the one or more mass storage devices 1528 implement the example database 470, the example sensor configuration(s) 472, and the example power profile(s) 474 of FIG. 4.

The machine executable instructions 1532 of FIGS. 9-14 may be stored in the mass storage device 1528, in the volatile memory 1514, in the non-volatile memory 1516, and/or on a removable non-transitory computer readable storage medium such as a CD or DVD.

Figure 16:
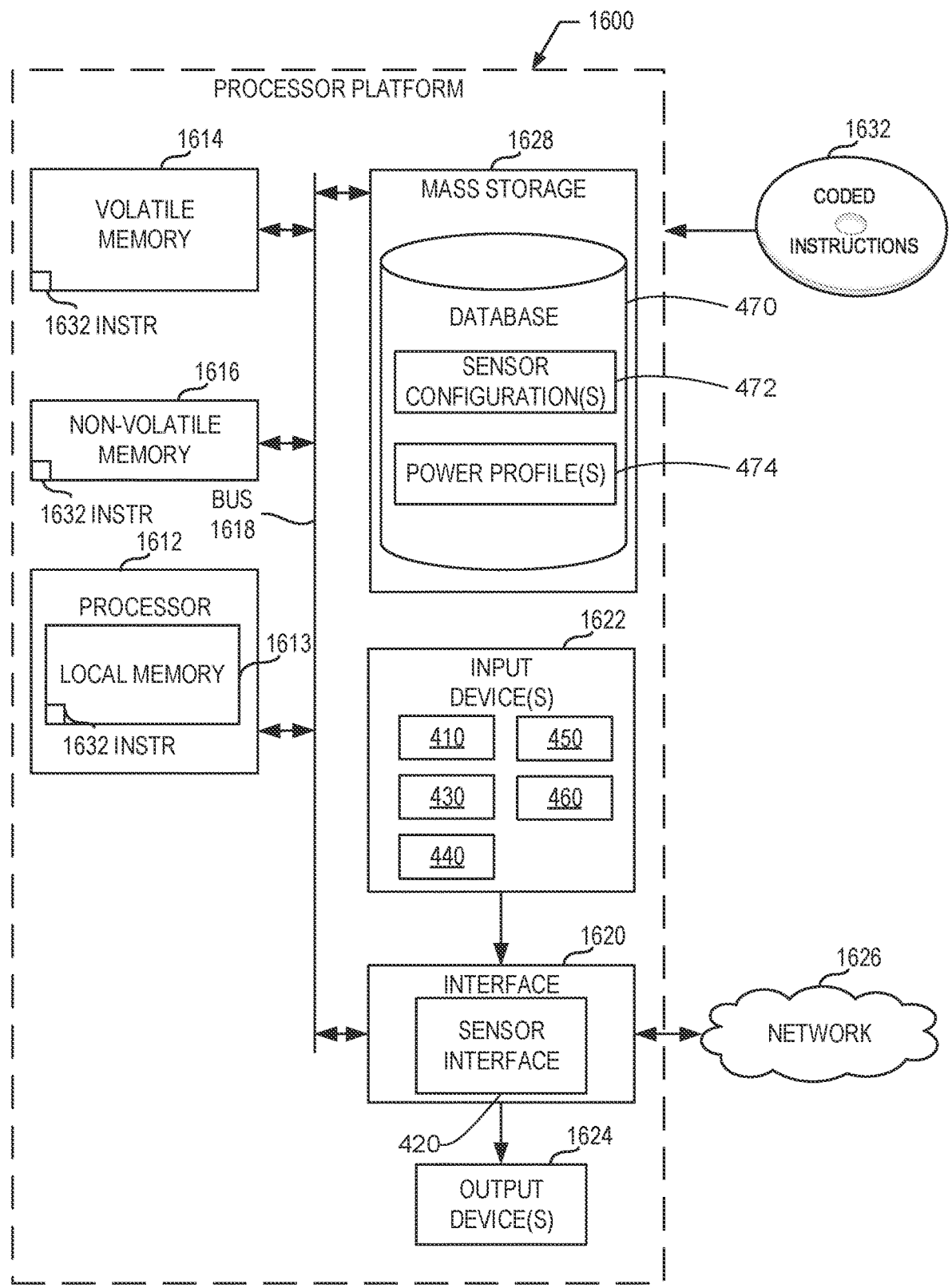
FIG. 16 is a block diagram of another example processing platform structured to execute the example machine readable instructions of FIGS. 12-14 to implement the example human detection controller of FIG. 4, and/or, more generally, the third example human detection system of FIG. 4.

FIG. 16 is a block diagram of an example processor platform 1600 structured to execute the instructions of FIGS. 9-14 to implement the example human detection controller 405 of FIG. 4. The processor platform 1600 can be, for example, a display panel, a personal computer, a workstation, or any other type of computing device. In some examples, the processor platform 1600 implements the first display panel 104 of FIG. 1 and/or portion(s) thereof. In some examples, the processor platform 1600 implements the second display panel 204 of FIG. 2 and/or portion(s) thereof.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, a PCI express interface, an I2C interface, and/or a SPI or other serial interface. In this example, the interface circuit 1620 implements the example sensor interface 420 of FIG. 4.

In the illustrated example, one or more input devices 1622 are connected to the interface circuit 1620. The input device (s) 1622 permit(s) a user to enter data and/or commands into the processor 1612. The input device(s) 1622 can be implemented by, for example, an HPS, an audio sensor, a microphone, a camera (still or video), a keyboard, a button, a mouse, a touchscreen, a track-pad, a trackball, isopoint, and/or a voice recognition system. In this example, the input device(s) 1622 implement the example sensor configurator 410, the example human detector 430, the example power profiler 440, the example command generator 450, and the example alert generator 460 of FIG. 4. Additionally or alternatively, the input device(s) 1622 may implement and/or otherwise include the sensor interface 420, the database 270, the sensor configuration(s) 472, and/or the power profile(s) 474. In some examples, the processor platform 1600 of the illustrated example is representative of a class, a genre, a spectrum, etc., of the input device(s) 1622 that also includes an interface circuit, such as the interface circuit 1620.

One or more output devices 1624 are also connected to the interface circuit 1620 of the illustrated example. The output devices 1624 can be implemented, for example, by display devices (e.g., an LED, an OLED, an LCD, a CRT display, an IPS display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives. In this example, the one or more mass storage devices 1628 implement the example database 470, the example sensor configuration(s) 472, and the example power profile(s) 474 of FIG. 4.

The machine executable instructions 1632 of FIGS. 9-14 may be stored in the mass storage device 1628, in the volatile memory 1614, in the non-volatile memory 1616, and/or on a removable non-transitory computer readable storage medium such as a CD or DVD.

Figure 17:
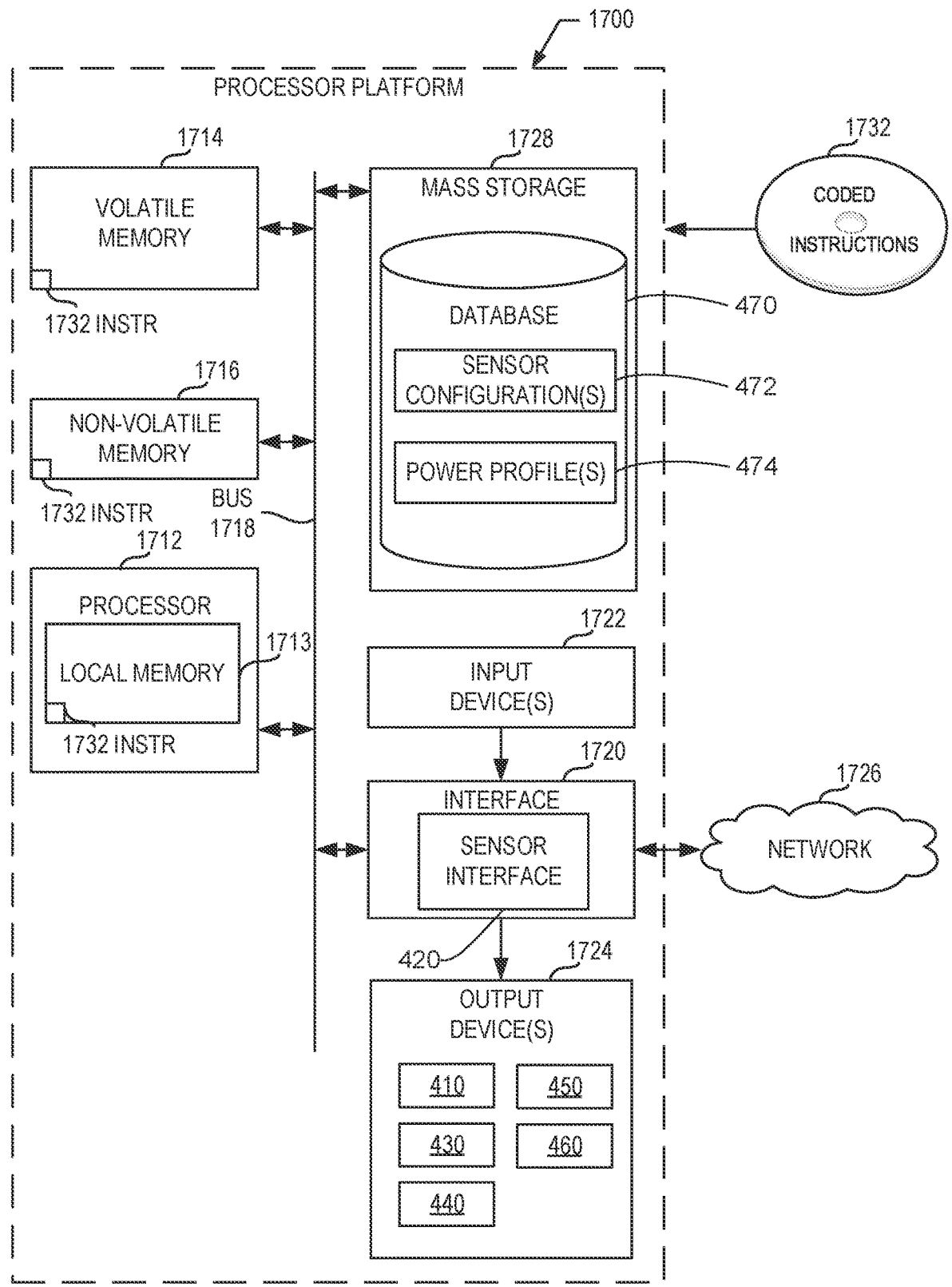
FIG. 17 is a block diagram of yet another example processing platform structured to execute the example machine readable instructions of FIGS. 12-14 to implement the example human detection controller of FIG. 4, and/or, more generally, the third example human detection system of FIG. 4.

FIG. 17 is a block diagram of an example processor platform 1700 structured to execute the instructions of FIGS. 9-14 to implement the example human detection controller 405 of FIG. 4. The processor platform 1700 can be, for example, a display panel, a personal computer, a workstation, or any other type of computing device. In some examples, the processor platform 1700 implements the first display panel 104 of FIG. 1 and/or portion(s) thereof. In some examples, the processor platform 1700 implements the second display panel 204 of FIG. 2 and/or portion(s) thereof.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, a PCI express interface, an I2C interface, and/or a SPI or other serial interface. In this example, the interface circuit 1720 implements the example sensor interface 420 of FIG. 4. In some examples, the processor platform 1700 of the illustrated example is representative of a class, a genre, a spectrum, etc., of the input device(s) 1722 that also includes an interface circuit, such as the interface circuit 1720.

In the illustrated example, one or more input devices 1722 are connected to the interface circuit 1720. The input device(s) 1722 permit(s) a user to enter data and/or commands into the processor 1712. The input device(s) 1722 can be implemented by, for example, an HPS, an audio sensor, a microphone, a camera (still or video), a keyboard, a button, a mouse, a touchscreen, a track-pad, a trackball, isopoint, and/or a voice recognition system.

One or more output devices 1724 are also connected to the interface circuit 1720 of the illustrated example. The output devices 1724 can be implemented, for example, by display devices (e.g., an LED, an OLED, an LCD, a CRT display, an IPS display, a touchscreen, etc.), a tactile output device, a printer and/or speaker. The interface circuit 1720 of the illustrated example, thus, typically includes a graphics driver card, a graphics driver chip and/or a graphics driver processor. In this example, the output device(s) 1724 implement the example sensor configurator 410, the example human detector 430, the example power profiler 440, the example command generator 450, and the example alert generator 460 of FIG. 4. Additionally or alternatively, the output device(s) 1724 may implement and/or otherwise include the sensor interface 420, the database 270, the sensor configuration(s) 472, and/or the power profile(s) 474. In some examples, the processor platform 1700 of the illustrated example is representative of a class, a genre, a spectrum, etc., of the output device(s) 1724 that also includes an interface circuit, such as the interface circuit 1720.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. In this example, the one or more mass storage devices 1728 implement the example database 470, the example sensor configuration(s) 472, and the example power profile(s) 474 of FIG. 4.

The machine executable instructions 1732 of FIGS. 9-14 may be stored in the mass storage device 1728, in the volatile memory 1714, in the non-volatile memory 1716, and/or on a removable non-transitory computer readable storage medium such as a CD or DVD.

From the foregoing, it will be appreciated that example systems, methods, apparatus, and articles of manufacture have been disclosed for display panel human presence detection. The disclosed systems, methods, apparatus, and articles of manufacture improve the efficiency of using a computing device to reduce power consumption and utilization of computational resources (e.g., processor(s), memory, storage, etc.) when a user steps away from the computing device. The disclosed systems, methods, apparatus, and articles of manufacture improve the efficiency of using a computing device by offloading human detection computing tasks from a host OS of host hardware to hardware included in a display panel and, thus, reduce the utilization of host hardware resources to execute the human detection computing tasks. The disclosed systems, methods, apparatus, and articles of manufacture are accordingly directed to one or more improvement(s) in the functioning of a computer.

Example methods, apparatus, systems, and articles of manufacture for display panel human detection are disclosed herein. Further examples and combinations thereof include the following:

Example 1 includes a display device comprising a sensor to generate a detection signal based on whether a human is detected, and logic circuitry to generate a control signal to cause an adjustment of a power state of the display device based on the detection signal.

Example 2 includes the display device of example 1, wherein the logic circuitry is to generate the control signal to reduce a backlight intensity of the display device or turn off the display device.

Example 3 includes the display device of example 1, wherein the logic circuitry is to determine that the detection signal is indicative of a presence of the human proximate the display device, and determine that a connection status signal indicates the display device is in communication with host hardware.

Example 4 includes the display device of example 3, wherein the control signal is to adjust the power state of the display device from a disabled state to an enabled state.

Example 5 includes the display device of example 1, wherein the logic circuitry is to determine that the detection signal is indicative of an absence of the human proximate the display device, and determine that a connection status signal indicates the display device is in communication with host hardware.

Example 6 includes the display device of example 5, wherein the control signal is to adjust the power state of the display device from an enabled state to a disabled state.

Example 7 includes the display device of example 1, further including display device hardware in circuit with the sensor and the logic circuitry, the display device hardware to assert a connection status signal in response to detecting that the display device is in communication with host hardware, and de-assert the connection status signal in response to not detecting that the display device is in communication with the host hardware.

Example 8 includes the display device of example 1, wherein the control signal is a first control signal, further including display device hardware in circuit with the sensor and the logic circuitry, the display device hardware to generate a connection status signal in response to detecting that the display device is in communication with host hardware, in response to obtaining the control signal, trigger a timer, in response to the timer elapsing, turn off the display device, and transmit a second control signal to the host hardware to cease transmission of display data from the host hardware to the display device.

Example 9 includes the display device of example 8, wherein the display device hardware is to turn off the display device in response to the timer elapsing without a change in the detection signal.

Example 10 includes the display device of example 1, further including display device hardware in circuit with the sensor, the display device hardware to configure the sensor based on detection parameters, and transmit at least one of the detection parameters or the detection signal to host hardware in communication with the display device hardware over a communication channel of a display interface.

Example 11 includes the display interface of example 10, wherein the communication channel is an auxiliary channel of a display interface.

Example 12 includes the display device of example 1, wherein the sensor is to generate the detection signal based on whether the human is detected proximate the display device.

Example 13 includes the display device of example 1, wherein at least one of the sensor is to generate the detection signal or the logic circuitry is to generate the control signal in response to an enable signal from host hardware in communication with the display device.

Example 14 includes the display device of example 1, wherein at least one of the sensor or the logic circuitry is to be disabled in response to a disable signal from host hardware in communication with the display device.

Example 15 includes the display device of example 14, wherein after the disabling of the at least one of the sensor or the logic circuitry, the at least one of the sensor or the logic circuitry is to be enabled in response to an enable signal from the host hardware.

Example 16 includes the display device of example 1, wherein at least one of the sensor or the logic circuitry is to maintain operation in response to a disconnection between the display device and host hardware.

Example 17 includes a computer readable storage medium comprising instructions that, when executed, cause a display device to at least generate an alert indicative of a change in human presence proximate the display device, the alert based on an output from a sensor included in the display device, detect that the display device is in communication with host hardware, and in response to the alert and the detection, adjust a power state of the display device.

Example 18 includes the computer readable storage medium of example 17, wherein the instructions, when executed, cause the display device to, in response to the human presence and the detection, adjust the power state by increasing a backlight intensity of the display device or turning on the display device.

Example 19 includes the computer readable storage medium of example 17, wherein the instructions, when executed, cause the display device to, in response to human absence and the detection, adjust the power state by decreasing a backlight intensity of the display device or turning off the display device.

Example 20 includes the computer readable storage medium of example 17, wherein the instructions, when executed, cause the display device to generate a connection status signal in response to detecting that the display device is in communication with the host hardware, in response to alert and the connection status signal, trigger a timer, in response to the timer satisfying a threshold without the alert indicative of a presence of a human during a time period associated with the timer, turn off the display device, and transmit a control signal to the host hardware to cause the host hardware to stop transmission of display data from the host hardware to the display device.

Example 21 includes the computer readable storage medium of example 17, wherein the instructions, when executed, cause the display device to configure the sensor based on detection parameters, obtain the alert from the sensor, and transmit at least one of the detection parameters or the alert to the host hardware.

Example 22 includes the computer readable storage medium of example 21, wherein the instructions, when executed, cause the display device to compare the at least one of the detection parameters or the alert to a power management profile, determine to adjust the power state of the display device based on the comparison, and invoke the display device to change the power state based on the determination.

Example 23 includes the computer readable storage medium of example 17, wherein the instructions, when executed, cause the display device to cause the sensor to generate the output in response to an enable signal from the host hardware.

Example 24 includes the computer readable storage medium of example 17, wherein the instructions, when executed, cause the display device to disable the sensor in response to a disable signal from the host hardware.

Example 25 includes the computer readable storage medium of example 24, wherein after the disabling of the sensor, the instructions, when executed, cause the display device to enable the sensor in response to an enable signal from the host hardware.

Example 26 includes the computer readable storage medium of example 17, wherein the instructions, when executed, cause the display device to cause the sensor to maintain operation in response to a disconnection between the display device and host hardware.

Example 27 includes a display device comprising first means for generating a detection signal based on whether a human is detected, and second means for generating a control signal to cause an adjustment of a power state of the display device based on the detection signal.

Example 28 includes the display device of example 27, wherein the second means for generating is to generate the control signal to reduce a backlight intensity of the display device or turn off the display device.

Example 29 includes the display device of example 27, wherein the second means for generating is to determine that the detection signal is indicative of a presence of the human proximate the display device, and determine that a connection status signal indicates the display device is in communication with host hardware.

Example 30 includes the display device of example 27, wherein the control signal is to adjust the power state of the display device from a disabled state to an enabled state.

Example 31 includes the display device of example 27, wherein the second means for generating is to determine that the detection signal is indicative of an absence of the human proximate the display device, and determine that a connection status signal indicates the display device is in communication with host hardware.

Example 32 includes the display device of example 31, wherein the control signal is to adjust the power state of the display device from an enabled state to a disabled state.

Example 33 includes the display device of example 27, further including means for asserting a connection status signal in response to detecting that the display device is in communication with host hardware, and means for de-asserting the connection status signal in response to not detecting that the display device is in communication with the host hardware.

Example 34 includes the display device of example 27, wherein the control signal is a first control signal, and further including third means for generating a connection status signal in response to detecting that the display device is in communication with host hardware, in response to obtaining the control signal, means for triggering a timer, in response to the timer elapsing, means for turning off the display device, and means for transmitting a second control signal to the host hardware to cease transmission of display data from the host hardware to the display device.

Example 35 includes the display device of example 34, wherein the means for turning is to turn off the display device in response to the timer elapsing without the detection signal changing indication of an absence of the human.

Example 36 includes the display device of example 27, further including means for configuring the first means for generating based on detection parameters, and means for transmitting at least one of the detection parameters or the detection signal to host hardware in communication with the display device.

Example 37 includes the display device of example 27, wherein the first means for generating is to generate the detection signal based on whether the human is detected proximate the display device.

Example 38 includes the display device of example 27, wherein at least one of the first means for generating is to generate the detection signal or the second means for generating is to generate the control signal in response to an enable signal from host hardware in communication with the display device.

Example 39 includes the display device of example 27, wherein at least one of the first means for generating or the second means for generating is to be disabled in response to a disable signal from host hardware in communication with the display device.

Example 40 includes the display device of example 39, wherein after the disabling of the at least one of the first means for generating or the second means for generating, the at least one of the first means for generating or the second means for generating is to be enabled in response to an enable signal from the host hardware.

Example 41 includes the display device of example 27, wherein at least one of the first means for generating or the second means for generating is to maintain operation in response to a disconnection between the display device and host hardware.

Example 42 includes a method for human presence detection, the method comprising generating an alert indicative of a change in human presence proximate a display device, the alert based on an output from a sensor included in the display device, detecting that the display device is in communication with host hardware, and in response to the alert and the detection, adjusting a power state of the display device.

Example 43 includes the method of example 42, further including, in response to the human presence and the detection, adjusting the power state by increasing a backlight intensity of the display device or turning on the display device.

Example 44 includes the method of example 42, further including, in response to human absence and the detection, adjusting the power state by decreasing a backlight intensity of the display device or turning off the display device.

Example 45 includes the method of example 42, further including generating a connection status signal in response to detecting that the display device is in communication with the host hardware, in response to alert and the connection status signal, triggering a timer, in response to the timer satisfying a threshold without the alert indicative of a presence of a human during a time period associated with the timer, turning off the display device, and transmitting a control signal to the host hardware to cause the host hardware to stop transmission of display data from the host hardware to the display device.

Example 46 includes the method of example 42, further including configuring the sensor based on detection parameters, obtaining the alert from the sensor, and transmitting at least one of the detection parameters or the alert to the host hardware.

Example 47 includes the method of example 46, further including comparing the at least one of the detection parameters or the alert to a power management profile, determining to adjust the power state of the display device based on the comparison, and invoking the display device to change the power state based on the determination.

Example 48 includes the method of example 42, further including enabling the sensor in response to an enable signal from the host hardware.

Example 49 includes the method of example 42, further including disabling the sensor in response to a disable signal from the host hardware.

Example 50 includes the method of example 49, further including after the disabling of the sensor, enabling the sensor in response to an enable signal from the host hardware.

Example 51 includes the method of example 42, wherein the sensor is to maintain operation in response to a disconnection between the display device and host hardware.

Example 52 includes the method of example 42, further including querying, by the host hardware, the display device for whether the sensor is included in the display device, and in response to the display device not including the sensor, transmitting, from the host hardware, display data to the display device.

Example 53 includes the method of example 42, wherein the display device is a first display device, and further including in response to a disconnection between the first display device and the host hardware, maintain operation of the host hardware, and in response to a connection between a second display device and the host hardware, transmit display data to the second display device, the second display device not including the sensor.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A display device comprising:
    a sensor to generate a detection signal based on whether a human is detected;
    first logic circuitry to:
        generate a first control signal based on (a) the detection signal and (b) a connection status signal, the connection status signal indicative of a connection to host hardware; and
        cause transmission of the first control signal to the host hardware via an auxiliary channel between the display device and the host hardware; and
    second logic circuitry in circuit with the sensor and the first logic circuitry, the second logic circuitry to:
        generate the connection status signal based on a detection that the display device is in communication with the host hardware;
        trigger a timer based on the detection signal indicating a human is not detected; and
        based on the timer elapsing, turn off the display device and de-assert the connection status signal, the first logic circuitry to, based on the de-assertion of the connection status signal, cause transmission of a second control signal to the host hardware to cease transmission of display data from the host hardware to the display device.

2. The display device of claim 1, wherein the second logic circuitry is to stop the timer based on the detection signal indicating a human is detected before the timer elapses.

3. The display device of claim 1, wherein the second logic circuitry is to reduce a backlight intensity of the display device based on the detection signal indicating a human is not detected.

4. The display device of claim 3, wherein the second logic circuitry is to increase the backlight intensity of the display device based on the detection signal indicating a human is detected.

5. The display device of claim 1, wherein the first logic circuitry is to:
    determine that the detection signal is indicative of a presence of the human proximate the display device; and
    determine that the connection status signal indicates the display device is in communication with the host hardware.

6. The display device of claim 5, wherein the first control signal is to cause the host hardware to transmit display data from the host hardware to the display device.

7. The display device of claim 1, wherein the first logic circuitry is to:
    determine that the detection signal is indicative of an absence of the human proximate the display device; and
    determine that the connection status signal indicates the display device is in communication with the host hardware.

8. The display device of claim 1, wherein the second logic circuitry is to turn off the display device based on the timer elapsing without a change in the detection signal.

9. The display device of claim 1, wherein the second logic circuitry is to:
    configure the sensor based on detection parameters; and
    cause transmission of at least one of the detection parameters or the detection signal to the host hardware over a communication channel of a display interface.

10. The display device of claim 9, wherein the communication channel is the auxiliary channel of the display interface.

11. The display device of claim 1, wherein the sensor is to generate the detection signal based on whether the human is detected proximate the display device.

12. The display device of claim 1, wherein at least one of the sensor is to generate the detection signal or the first logic circuitry is to generate the first control signal based on an enable signal from the host hardware.

13. The display device of claim 1, wherein at least one of the sensor or the first logic circuitry is to be disabled based on a disable signal from the host hardware.

14. The display device of claim 13, wherein after the the at least one of the sensor or the first logic circuitry is disabled, the at least one of the sensor or the first logic circuitry is to be enabled based on an enable signal from the host hardware.

15. The display device of claim 1, wherein at least one of the sensor or the first logic circuitry is to maintain operation based on a disconnection between the display device and the host hardware.

16. A computer readable storage medium comprising instructions that cause a display device to at least:
    generate a first alert indicative of a human presence proximate the display device, the first alert based on a first output from a sensor included in the display device;
    detect that the display device is in communication with host hardware;
    based on the first alert and the detection, generate a first control signal;
    transmit the first control signal to the host hardware via an auxiliary channel between the display device and the host hardware;
    generate a second alert indicative of a human absence proximate the display device, the second alert based on a second output from the sensor;
    based on the second alert, start a timer; and
    based on the timer elapsing, turn off the display device and transmit a second control signal to the host hardware to cease transmission of display data from the host hardware to the display device.

17. The computer readable storage medium of claim 16, wherein the instructions cause the display device to, based on the first alert and the detection, adjust a power state of the display device by increasing a backlight intensity of the display device or turning on the display device.

18. The computer readable storage medium of claim 16, wherein the instructions cause the display device to, based on the second alert, adjust a power state of the display device by decreasing a backlight intensity of the display device or turning off the display device.

19. A display device comprising:
first means for generating a detection signal based on whether a human is detected; and
second means for generating control signals to:
generate a first control signal based on (a) the detection signal indicating a human is detected and (b) a connection status signal indicative of a connection to host hardware;
cause transmission of the first control signal to the host hardware via an auxiliary channel between the display device and the host hardware;
trigger a timer based on a change in the detection signal indicating a human is not detected; and
based on the timer elapsing and the detection signal indicating a human is not detected, turn off the display device and cause transmission of a second control signal to the host hardware to cease transmission of display data from the host hardware to the display device.

20. The display device of claim 19, further including:
means for asserting the connection status signal based on detecting that the display device is in communication with the host hardware, the means for asserting including means for de-asserting the connection status signal based on not detecting that the display device is in communication with the host hardware.

21. The display device of claim 19, wherein the second means for generating is to, based on the detection signal indicating a human is not detected, cause a backlight intensity of the display device to be decreased.

22. A method for human presence detection, the method comprising:
generating a first alert indicative of a human presence proximate a display device, the first alert based on a first output from a sensor included in the display device;
detecting that the display device is in communication with host hardware;
based on the first alert and the detection, providing, via at least one logic circuit in the display device, a first control signal to the host hardware via an auxiliary channel between the display device and the host hardware;
generating a second alert indicative of a human absence proximate the display device, the second alert based on a second output from the sensor;
based on the second alert, starting a timer; and
based on the timer reaching a threshold period of time, turning off the display device and providing a second control signal to the host hardware to cease transmission of display data from the host hardware to the display device.

23. The method of claim 22, further including:
comparing one or more detection parameters or the first alert to a power management profile;
determining to adjust a power state of the display device based on the comparison; and
invoking the display device to change the power state based on the determination.

24. The method of claim 22, further including:
querying, by the host hardware, the display device for whether the sensor is included in the display device; and
based on the display device not including the sensor, transmitting, from the host hardware, display data to the display device.

* * * * *

UNITED STATES PATENT AND TRADEMARK OFFICE
CERTIFICATE OF CORRECTION

PATENT NO. : 12,306,692 B2
APPLICATION NO. : 17/917876
DATED : May 20, 2025
INVENTOR(S) : Raghavulu et al.

It is certified that error appears in the above-identified patent and that said Letters Patent is hereby corrected as shown below:

In the Claims

Column 50, Claim 14, Line 38, delete "wherein after the the" and Insert --wherein after the--.

Signed and Sealed this
Seventeenth Day of June, 2025

Coke Morgan Stewart
*Acting Director of the United States Patent and Trademark Office*